(12) United States Patent
Nguyen et al.

(10) Patent No.: US 9,080,917 B2
(45) Date of Patent: Jul. 14, 2015

(54) SYSTEM AND METHODS FOR USING DIELECTRIC PROPERTIES OF AN INSULATED CONDUCTOR IN A SUBSURFACE FORMATION TO ASSESS PROPERTIES OF THE INSULATED CONDUCTOR

(71) Applicant: SHELL OIL COMPANY, Houston, TX (US)

(72) Inventors: Scott Vinh Nguyen, Houston, TX (US); Ronald Marshall Bass, Houston, TX (US); Stephen Taylor Thompson, Houston, TX (US); Edward Everett de St. Remey, Katy, TX (US); Dhruv Arora, Houston, TX (US); David Booth Burns, Houston, TX (US); Christopher Kelvin Harris, Calgary (CA)

(73) Assignee: Shell Oil Company, Houston, TX (US)

( * ) Notice: Subject to any disclaimer, the term of this patent is extended or adjusted under 35 U.S.C. 154(b) by 218 days.

(21) Appl. No.: 13/644,460

(22) Filed: Oct. 4, 2012

(65) Prior Publication Data
US 2013/0087327 A1    Apr. 11, 2013

Related U.S. Application Data

(60) Provisional application No. 61/544,824, filed on Oct. 7, 2011.

(51) Int. Cl.
*E21B 47/00* (2012.01)
*G01K 7/34* (2006.01)
(Continued)

(52) U.S. Cl.
CPC ............ *G01K 7/343* (2013.01); *E21B 47/065* (2013.01); *E21B 47/123* (2013.01); *G01K 2213/00* (2013.01)

(58) Field of Classification Search
USPC ............ 166/250.01, 272.1, 302, 57, 60, 65.1; 374/136, 137, 124, 166, 110, 112, 131, 374/120, 121, 161, 45, 43, E13.001
See application file for complete search history.

(56) References Cited

U.S. PATENT DOCUMENTS

| 1,457,690 | A | 6/1923 | Brine |
| 1,477,802 | A | 12/1923 | Beck |
| 2,011,710 | A | 8/1935 | Davis |

(Continued)

FOREIGN PATENT DOCUMENTS

| CA | 899987 | 5/1972 |
| CA | 1253555 | 5/1989 |

(Continued)

OTHER PUBLICATIONS

PCT International Search Report, Application No. PCT/US2012/058590 dated Jan. 22, 2013.

(Continued)

*Primary Examiner* — David Andrews
*Assistant Examiner* — Taras P Bemko

(57) ABSTRACT

A system for assessing one or more temperatures along an insulated conductor in an opening in a subsurface formation includes an insulated conductor with a length comprising at least two sections of insulation with different capacitances. The sections with the different capacitances include different takeoff temperatures for at least one dielectric property of the insulation.

27 Claims, 5 Drawing Sheets

(51) Int. Cl.
*E21B 47/06* (2012.01)
*E21B 47/12* (2012.01)

(56) References Cited

U.S. PATENT DOCUMENTS

| | | | |
|---|---|---|---|
| 2,078,051 A | 4/1937 | Berndt | |
| 2,244,255 A | 6/1941 | Looman | |
| 2,680,086 A | 6/1954 | Hollingsworth et al. | |
| 2,757,739 A | 8/1956 | Douglas et al. | |
| 2,794,504 A | 6/1957 | Carpenter | |
| 2,942,223 A | 6/1960 | Lennox et al. | |
| 3,026,940 A | 3/1962 | Spitz | |
| 3,114,417 A | 12/1963 | McCarthy | |
| 3,131,763 A | 5/1964 | Kunetka et al. | |
| 3,141,924 A | 7/1964 | Forney, Jr. | |
| 3,149,672 A | 9/1964 | Orkiszewski et al. | |
| 3,207,220 A | 9/1965 | Williams | |
| 3,299,202 A | 1/1967 | Brown | |
| 3,316,344 A | 4/1967 | Kidd et al. | |
| 3,342,267 A | 9/1967 | Cotter et al. | |
| 3,384,704 A | 5/1968 | Vockroth | |
| 3,410,977 A | 11/1968 | Ando | |
| 3,477,058 A | 11/1969 | Vedder et al. | |
| 3,492,463 A | 1/1970 | Wringer et al. | |
| 3,515,837 A | 6/1970 | Ando | |
| 3,547,192 A | 12/1970 | Claridge et al. | |
| 3,562,401 A | 2/1971 | Long | |
| 3,580,987 A | 5/1971 | Priaroggia | |
| 3,595,082 A | 7/1971 | Miller et al. | |
| 3,614,387 A | 10/1971 | Wrob et al. | |
| 3,629,551 A | 12/1971 | Ando | |
| 3,657,520 A | 4/1972 | Ragault | |
| 3,672,196 A | 6/1972 | Levacher et al. | |
| 3,679,812 A | 7/1972 | Owens | |
| 3,685,148 A | 8/1972 | Garfinkel | |
| 3,757,860 A | 9/1973 | Pritchett | |
| 3,761,599 A | 9/1973 | Beatty | |
| 3,798,349 A | 3/1974 | Thompson et al. | |
| 3,844,352 A | 10/1974 | Garrett | |
| 3,859,503 A | 1/1975 | Palone | |
| 3,893,961 A | 7/1975 | Walton et al. | |
| 3,895,180 A | 7/1975 | Plummer | |
| 3,896,260 A | 7/1975 | Plummer | |
| 4,110,550 A | 8/1978 | Di Pietro | |
| 4,132,858 A * | 1/1979 | Anderson et al. | 174/120 SR |
| 4,234,755 A | 11/1980 | Simons | |
| 4,256,945 A | 3/1981 | Carter et al. | |
| 4,280,046 A | 7/1981 | Shimotori et al. | |
| 4,317,003 A | 2/1982 | Gray | |
| 4,344,483 A | 8/1982 | Fisher et al. | |
| 4,354,053 A | 10/1982 | Gold | |
| 4,365,947 A | 12/1982 | Bahder et al. | |
| 4,368,452 A | 1/1983 | Kerr, Jr. | |
| 4,370,518 A | 1/1983 | Guzy | |
| 4,470,459 A | 9/1984 | Copland | |
| 4,484,022 A | 11/1984 | Eilentropp | |
| 4,496,795 A | 1/1985 | Konnik | |
| 4,520,229 A | 5/1985 | Luzzi et al. | |
| 4,524,827 A | 6/1985 | Bridges et al. | |
| 4,538,682 A | 9/1985 | McManus et al. | |
| 4,549,073 A | 10/1985 | Tamura et al. | |
| 4,570,715 A | 2/1986 | Van Meurs et al. | |
| 4,572,299 A | 2/1986 | Vanegmond et al. | |
| 4,585,066 A | 4/1986 | Moore et al. | |
| 4,623,401 A | 11/1986 | Derbyshire et al. | |
| 4,626,665 A | 12/1986 | Fort, III | |
| 4,639,712 A | 1/1987 | Kobayashi et al. | |
| 4,645,906 A | 2/1987 | Yagnik et al. | |
| 4,662,437 A | 5/1987 | Renfro et al. | |
| 4,694,907 A | 9/1987 | Stahl et al. | |
| 4,695,713 A | 9/1987 | Krumme | |
| 4,698,583 A | 10/1987 | Sandberg | |
| 4,701,587 A | 10/1987 | Carter et al. | |
| 4,704,514 A | 11/1987 | Van Egmond et al. | |
| 4,716,960 A | 1/1988 | Eastlund et al. | |
| 4,717,814 A | 1/1988 | Krumme | |
| 4,733,057 A | 3/1988 | Stanzel et al. | |
| 4,752,673 A | 6/1988 | Krumme | |
| 4,785,163 A | 11/1988 | Sandberg | |
| 4,786,760 A | 11/1988 | Friedhelm | |
| 4,794,226 A | 12/1988 | Derbyshire | |
| 4,814,587 A | 3/1989 | Carter | |
| 4,821,798 A | 4/1989 | Bridges et al. | |
| 4,837,409 A | 6/1989 | Klosin | |
| 4,848,924 A | 7/1989 | Nuspl et al. | |
| 4,849,611 A | 7/1989 | Whitney et al. | |
| 4,859,200 A | 8/1989 | McIntosh et al. | |
| 4,886,118 A | 12/1989 | Van Meurs et al. | |
| 4,947,672 A | 8/1990 | Pecora et al. | |
| 4,979,296 A | 12/1990 | Langner et al. | |
| 4,985,313 A | 1/1991 | Penneck et al. | |
| 5,040,601 A | 8/1991 | Karlsson et al. | |
| 5,060,287 A | 10/1991 | Van Egmond | |
| 5,065,501 A | 11/1991 | Henschen et al. | |
| 5,065,818 A | 11/1991 | Van Egmond | |
| 5,066,852 A | 11/1991 | Willbanks | |
| 5,070,533 A | 12/1991 | Bridges et al. | |
| 5,073,625 A | 12/1991 | Derbyshire | |
| 5,082,494 A | 1/1992 | Crompton | |
| 5,152,341 A | 10/1992 | Kasevich | |
| 5,182,427 A | 1/1993 | McGaffigan | |
| 5,189,283 A | 2/1993 | Carl, Jr. et al. | |
| 5,207,273 A | 5/1993 | Cates et al. | |
| 5,209,987 A | 5/1993 | Penneck et al. | |
| 5,226,961 A | 7/1993 | Nahm et al. | |
| 5,231,249 A | 7/1993 | Kimura et al. | |
| 5,245,161 A | 9/1993 | Okamoto | |
| 5,278,353 A | 1/1994 | Buchholz et al. | |
| 5,289,882 A | 3/1994 | Moore | |
| 5,315,065 A | 5/1994 | O'Donovan | |
| 5,316,492 A | 5/1994 | Schaareman | |
| 5,403,977 A | 4/1995 | Steptoe et al. | |
| 5,406,030 A | 4/1995 | Boggs | |
| 5,408,047 A | 4/1995 | Wentzel | |
| 5,453,599 A | 9/1995 | Hall, Jr. | |
| 5,483,414 A | 1/1996 | Turtiainen | |
| 5,512,732 A | 4/1996 | Yagnik et al. | |
| 5,553,478 A | 9/1996 | Di Troia | |
| 5,579,575 A | 12/1996 | Lamome et al. | |
| 5,619,611 A | 4/1997 | Loschen et al. | |
| 5,621,844 A | 4/1997 | Bridges | |
| 5,624,188 A | 4/1997 | West | |
| 5,667,009 A | 9/1997 | Moore | |
| 5,669,275 A | 9/1997 | Mills | |
| 5,683,273 A | 11/1997 | Garver et al. | |
| 5,713,415 A | 2/1998 | Bridges | |
| 5,782,301 A | 7/1998 | Neuroth et al. | |
| 5,784,530 A | 7/1998 | Bridges | |
| 5,788,376 A | 8/1998 | Sultan et al. | |
| 5,801,332 A | 9/1998 | Berger et al. | |
| 5,854,472 A | 12/1998 | Wildi | |
| 5,875,283 A | 2/1999 | Yane et al. | |
| 5,911,898 A | 6/1999 | Jacobs et al. | |
| 5,987,745 A | 11/1999 | Hoglund et al. | |
| 6,015,015 A | 1/2000 | Luft et al. | |
| 6,023,554 A | 2/2000 | Vinegar et al. | |
| 6,056,057 A | 5/2000 | Vinegar et al. | |
| 6,079,499 A | 6/2000 | Mikus et al. | |
| 6,102,122 A | 8/2000 | de Rouffignac | |
| 6,288,372 B1 | 9/2001 | Sandberg et al. | |
| 6,313,431 B1 | 11/2001 | Schneider et al. | |
| 6,326,546 B1 | 12/2001 | Karlsson | |
| 6,364,721 B2 | 4/2002 | Stewart, III | |
| 6,388,947 B1 | 5/2002 | Washbourne et al. | |
| 6,423,952 B1 | 7/2002 | Meisiek | |
| 6,452,105 B2 | 9/2002 | Badii et al. | |
| 6,472,600 B1 | 10/2002 | Osmani et al. | |
| 6,581,684 B2 | 6/2003 | Wellington et al. | |
| 6,583,351 B1 | 6/2003 | Artman | |
| 6,585,046 B2 | 7/2003 | Neuroth et al. | |
| 6,588,503 B2 | 7/2003 | Karanikas et al. | |
| 6,588,504 B2 | 7/2003 | Wellington et al. | |
| 6,591,906 B2 | 7/2003 | Wellington et al. | |
| 6,591,907 B2 | 7/2003 | Zhang et al. | |

(56) References Cited

U.S. PATENT DOCUMENTS

| | | |
|---|---|---|
| 6,607,033 B2 | 8/2003 | Wellington et al. |
| 6,609,570 B2 | 8/2003 | Wellington et al. |
| 6,688,387 B1 | 2/2004 | Wellington et al. |
| 6,698,515 B2 | 3/2004 | Karanikas et al. |
| 6,702,016 B2 | 3/2004 | de Rouffignac et al. |
| 6,712,135 B2 | 3/2004 | Wellington et al. |
| 6,712,136 B2 | 3/2004 | de Rouffignac et al. |
| 6,712,137 B2 | 3/2004 | Vinegar et al. |
| 6,715,546 B2 | 4/2004 | Vinegar et al. |
| 6,715,547 B2 | 4/2004 | Vinegar et al. |
| 6,715,548 B2 | 4/2004 | Wellington et al. |
| 6,715,549 B2 | 4/2004 | Wellington et al. |
| 6,719,047 B2 | 4/2004 | Fowler et al. |
| 6,722,429 B2 | 4/2004 | de Rouffignac et al. |
| 6,722,430 B2 | 4/2004 | Vinegar et al. |
| 6,722,431 B2 | 4/2004 | Karanikas et al. |
| 6,725,920 B2 | 4/2004 | Zhang et al. |
| 6,725,928 B2 | 4/2004 | Vinegar et al. |
| 6,729,395 B2 | 5/2004 | Shahin, Jr. et al. |
| 6,729,396 B2 | 5/2004 | Vinegar et al. |
| 6,729,397 B2 | 5/2004 | Zhang et al. |
| 6,729,401 B2 | 5/2004 | Vinegar et al. |
| 6,732,794 B2 | 5/2004 | Wellington et al. |
| 6,732,795 B2 | 5/2004 | de Rouffignac et al. |
| 6,732,796 B2 | 5/2004 | Vinegar et al. |
| 6,736,215 B2 | 5/2004 | Maher et al. |
| 6,739,393 B2 | 5/2004 | Vinegar et al. |
| 6,739,394 B2 | 5/2004 | Vinegar et al. |
| 6,742,587 B2 | 6/2004 | Vinegar et al. |
| 6,742,588 B2 | 6/2004 | Wellington et al. |
| 6,742,589 B2 | 6/2004 | Berchenko et al. |
| 6,742,593 B2 | 6/2004 | Vinegar et al. |
| 6,745,831 B2 | 6/2004 | de Rouffignac et al. |
| 6,745,832 B2 | 6/2004 | Wellington et al. |
| 6,745,837 B2 | 6/2004 | Wellington et al. |
| 6,749,021 B2 | 6/2004 | Vinegar et al. |
| 6,752,210 B2 | 6/2004 | de Rouffignac et al. |
| 6,758,268 B2 | 7/2004 | Vinegar et al. |
| 6,761,216 B2 | 7/2004 | Vinegar et al. |
| 6,769,483 B2 | 8/2004 | de Rouffignac et al. |
| 6,769,485 B2 | 8/2004 | Vinegar et al. |
| 6,773,311 B2 | 8/2004 | Mello et al. |
| 6,782,947 B2 | 8/2004 | de Rouffignac et al. |
| 6,789,625 B2 | 9/2004 | de Rouffignac et al. |
| 6,805,195 B2 | 10/2004 | Vinegar et al. |
| 6,820,688 B2 | 11/2004 | Vinegar et al. |
| 6,849,800 B2 | 2/2005 | Mazurkiewicz |
| 6,866,097 B2 | 3/2005 | Vinegar et al. |
| 6,871,707 B2 | 3/2005 | Karanikas et al. |
| 6,877,554 B2 | 4/2005 | Stegemeier et al. |
| 6,877,555 B2 | 4/2005 | Karanikas et al. |
| 6,880,633 B2 | 4/2005 | Wellington et al. |
| 6,880,635 B2 | 4/2005 | Vinegar et al. |
| 6,886,638 B2 | 5/2005 | Ahmed et al. |
| 6,889,769 B2 | 5/2005 | Wellington et al. |
| 6,896,053 B2 | 5/2005 | Berchenko et al. |
| 6,902,003 B2 | 6/2005 | Maher et al. |
| 6,902,004 B2 | 6/2005 | de Rouffignac et al. |
| 6,910,536 B2 | 6/2005 | Wellington et al. |
| 6,913,078 B2 | 7/2005 | Shahin, Jr. et al. |
| 6,915,850 B2 | 7/2005 | Vinegar et al. |
| 6,918,442 B2 | 7/2005 | Wellington et al. |
| 6,918,443 B2 | 7/2005 | Wellington et al. |
| 6,923,257 B2 | 8/2005 | Wellington et al. |
| 6,923,258 B2 | 8/2005 | Wellington et al. |
| 6,929,067 B2 | 8/2005 | Vinegar et al. |
| 6,932,155 B2 | 8/2005 | Vinegar et al. |
| 6,942,032 B2 | 9/2005 | La Rovere et al. |
| 6,948,562 B2 | 9/2005 | Wellington et al. |
| 6,948,563 B2 | 9/2005 | Wellington et al. |
| 6,951,247 B2 | 10/2005 | de Rouffignac et al. |
| 6,953,087 B2 | 10/2005 | de Rouffignac et al. |
| 6,958,704 B2 | 10/2005 | Vinegar et al. |
| 6,959,761 B2 | 11/2005 | Berchenko et al. |
| 6,964,300 B2 | 11/2005 | Vinegar et al. |
| 6,966,372 B2 | 11/2005 | Wellington et al. |
| 6,966,374 B2 | 11/2005 | Vinegar et al. |
| 6,969,123 B2 | 11/2005 | Vinegar et al. |
| 6,973,967 B2 | 12/2005 | Stegemeier et al. |
| 6,981,548 B2 | 1/2006 | Wellington et al. |
| 6,991,032 B2 | 1/2006 | Berchenko et al. |
| 6,991,033 B2 | 1/2006 | Wellington et al. |
| 6,991,036 B2 | 1/2006 | Sumnu-Dindoruk et al. |
| 6,991,045 B2 | 1/2006 | Vinegar et al. |
| 6,994,160 B2 | 2/2006 | Wellington et al. |
| 6,994,161 B2 | 2/2006 | Maher et al. |
| 6,994,168 B2 | 2/2006 | Wellington et al. |
| 6,994,169 B2 | 2/2006 | Zhang et al. |
| 6,997,255 B2 | 2/2006 | Wellington et al. |
| 6,997,518 B2 | 2/2006 | Vinegar et al. |
| 7,004,247 B2 | 2/2006 | Cole et al. |
| 7,004,251 B2 | 2/2006 | Ward et al. |
| 7,011,154 B2 | 3/2006 | Maher et al. |
| 7,013,972 B2 | 3/2006 | Vinegar et al. |
| 7,036,583 B2 | 5/2006 | de Rouffignac et al. |
| 7,040,397 B2 | 5/2006 | de Rouffignac et al. |
| 7,040,398 B2 | 5/2006 | Wellington et al. |
| 7,040,399 B2 | 5/2006 | Wellington et al. |
| 7,040,400 B2 | 5/2006 | de Rouffignac et al. |
| 7,051,807 B2 | 5/2006 | Vinegar et al. |
| 7,051,808 B1 | 5/2006 | Vinegar et al. |
| 7,051,811 B2 | 5/2006 | de Rouffignac et al. |
| 7,055,600 B2 | 6/2006 | Messier et al. |
| 7,063,145 B2 | 6/2006 | Veenstra et al. |
| 7,066,254 B2 | 6/2006 | Vinegar et al. |
| 7,066,257 B2 | 6/2006 | Wellington et al. |
| 7,073,578 B2 | 7/2006 | Vinegar et al. |
| 7,077,198 B2 | 7/2006 | Vinegar et al. |
| 7,077,199 B2 | 7/2006 | Vinegar et al. |
| 7,086,465 B2 | 8/2006 | Wellington et al. |
| 7,086,468 B2 | 8/2006 | de Rouffignac et al. |
| 7,090,013 B2 | 8/2006 | Wellington |
| 7,096,941 B2 | 8/2006 | de Rouffignac et al. |
| 7,096,942 B1 | 8/2006 | de Rouffignac et al. |
| 7,096,953 B2 | 8/2006 | de Rouffignac et al. |
| 7,100,994 B2 | 9/2006 | Vinegar et al. |
| 7,104,319 B2 | 9/2006 | Vinegar et al. |
| 7,114,566 B2 | 10/2006 | Vinegar et al. |
| 7,121,341 B2 | 10/2006 | Vinegar et al. |
| 7,121,342 B2 | 10/2006 | Vinegar et al. |
| 7,128,153 B2 | 10/2006 | Vinegar et al. |
| 7,153,373 B2 | 12/2006 | Maziasz et al. |
| 7,156,176 B2 | 1/2007 | Vinegar et al. |
| 7,165,615 B2 | 1/2007 | Vinegar et al. |
| 7,172,038 B2 | 2/2007 | Terry et al. |
| 7,219,734 B2 | 5/2007 | Bai et al. |
| 7,225,866 B2 | 6/2007 | Berchenko et al. |
| 7,258,752 B2 | 8/2007 | Maziasz et al. |
| 7,320,364 B2 | 1/2008 | Fairbanks |
| 7,337,841 B2 | 3/2008 | Ravi |
| 7,353,872 B2 | 4/2008 | Sandberg et al. |
| 7,357,180 B2 | 4/2008 | Vinegar et al. |
| 7,360,588 B2 | 4/2008 | Vinegar et al. |
| 7,370,704 B2 | 5/2008 | Harris |
| 7,383,877 B2 | 6/2008 | Vinegar et al. |
| 7,398,823 B2 | 7/2008 | Montgomery et al. |
| 7,405,358 B2 | 7/2008 | Emerson |
| 7,424,915 B2 | 9/2008 | Vinegar et al. |
| 7,431,076 B2 | 10/2008 | Sandberg et al. |
| 7,435,037 B2 | 10/2008 | McKinzie, II |
| 7,461,691 B2 | 12/2008 | Vinegar et al. |
| 7,481,274 B2 | 1/2009 | Vinegar et al. |
| 7,490,665 B2 | 2/2009 | Sandberg et al. |
| 7,500,528 B2 | 3/2009 | McKinzie, II et al. |
| 7,510,000 B2 | 3/2009 | Pastor-Sanz et al. |
| 7,527,094 B2 | 5/2009 | McKinzie et al. |
| 7,533,719 B2 | 5/2009 | Hinson et al. |
| 7,540,324 B2 | 6/2009 | de Rouffignac et al. |
| 7,546,873 B2 | 6/2009 | Kim |
| 7,549,470 B2 | 6/2009 | Vinegar et al. |
| 7,556,095 B2 | 7/2009 | Vinegar |
| 7,556,096 B2 | 7/2009 | Vinegar et al. |
| 7,559,367 B2 | 7/2009 | Vinegar et al. |
| 7,559,368 B2 | 7/2009 | Vinegar et al. |

(56) References Cited

U.S. PATENT DOCUMENTS

| | | |
|---|---|---|
| 7,562,706 B2 | 7/2009 | Li et al. |
| 7,562,707 B2 | 7/2009 | Miller |
| 7,563,983 B2 | 7/2009 | Bryant |
| 7,575,052 B2 | 8/2009 | Sandberg et al. |
| 7,575,053 B2 | 8/2009 | Vinegar et al. |
| 7,581,589 B2 | 9/2009 | Roes et al. |
| 7,584,789 B2 | 9/2009 | Mo et al. |
| 7,591,310 B2 | 9/2009 | Minderhoud et al. |
| 7,597,147 B2 | 10/2009 | Vitek et al. |
| 7,604,052 B2 | 10/2009 | Roes et al. |
| 7,610,962 B2 | 11/2009 | Fowler |
| 7,631,689 B2 | 12/2009 | Vinegar et al. |
| 7,631,690 B2 | 12/2009 | Vinegar et al. |
| 7,635,023 B2 | 12/2009 | Goldberg et al. |
| 7,635,024 B2 | 12/2009 | Karanikas et al. |
| 7,635,025 B2 | 12/2009 | Vinegar et al. |
| 7,640,980 B2 | 1/2010 | Vinegar et al. |
| 7,644,765 B2 | 1/2010 | Stegemeier et al. |
| 7,673,681 B2 | 3/2010 | Vinegar et al. |
| 7,673,786 B2 | 3/2010 | Menotti |
| 7,677,310 B2 | 3/2010 | Vinegar et al. |
| 7,677,314 B2 | 3/2010 | Hsu |
| 7,681,647 B2 | 3/2010 | Mudunuri et al. |
| 7,683,296 B2 | 3/2010 | Brady et al. |
| 7,703,513 B2 | 4/2010 | Vinegar et al. |
| 7,717,171 B2 | 5/2010 | Stegemeier et al. |
| 7,730,936 B2 | 6/2010 | Hernandez-Solis et al. |
| 7,730,945 B2 | 6/2010 | Pietersen et al. |
| 7,730,946 B2 | 6/2010 | Vinegar et al. |
| 7,730,947 B2 | 6/2010 | Stegemeier et al. |
| 7,735,935 B2 | 6/2010 | Vinegar et al. |
| 7,764,871 B2 | 7/2010 | Rodegher |
| 7,785,427 B2 | 8/2010 | Maziasz et al. |
| 7,793,722 B2 | 9/2010 | Vinegar et al. |
| 7,798,220 B2 | 9/2010 | Vinegar et al. |
| 7,798,221 B2 | 9/2010 | Vinegar et al. |
| 7,831,133 B2 | 11/2010 | Vinegar et al. |
| 7,831,134 B2 | 11/2010 | Vinegar et al. |
| 7,832,484 B2 | 11/2010 | Nguyen et al. |
| 7,841,401 B2 | 11/2010 | Kuhlman et al. |
| 7,841,408 B2 | 11/2010 | Vinegar |
| 7,841,425 B2 | 11/2010 | Mansure et al. |
| 7,845,411 B2 | 12/2010 | Vinegar et al. |
| 7,849,922 B2 | 12/2010 | Vinegar et al. |
| 7,860,377 B2 | 12/2010 | Vinegar et al. |
| 7,866,385 B2 | 1/2011 | Lambirth |
| 7,866,386 B2 | 1/2011 | Beer |
| 7,866,388 B2 | 1/2011 | Bravo |
| 7,912,358 B2 | 3/2011 | Stone et al. |
| 7,931,086 B2 | 4/2011 | Nguyen et al. |
| 7,942,197 B2 | 5/2011 | Fairbanks et al. |
| 7,942,203 B2 | 5/2011 | Vinegar et al. |
| 7,950,453 B2 | 5/2011 | Farmayan et al. |
| 7,986,869 B2 | 7/2011 | Vinegar et al. |
| 8,011,451 B2 | 9/2011 | McDonald |
| 8,027,571 B2 | 9/2011 | Vinegar et al. |
| 8,042,610 B2 | 10/2011 | Harris et al. |
| 8,083,813 B2 | 12/2011 | Nair et al. |
| 8,113,272 B2 | 2/2012 | Vinegar |
| 8,146,661 B2 | 4/2012 | Bravo et al. |
| 8,146,669 B2 | 4/2012 | Mason |
| 8,151,880 B2 | 4/2012 | Roes et al. |
| 8,151,907 B2 | 4/2012 | MacDonald |
| 8,162,059 B2 | 4/2012 | Nguyen et al. |
| 8,162,405 B2 | 4/2012 | Burns et al. |
| 8,172,335 B2 | 5/2012 | Burns et al. |
| 8,177,305 B2 | 5/2012 | Burns et al. |
| 8,191,630 B2 | 6/2012 | Stegemeier et al. |
| 8,192,682 B2 | 6/2012 | Maziasz et al. |
| 8,196,658 B2 | 6/2012 | Miller et al. |
| 8,200,072 B2 | 6/2012 | Vinegar et al. |
| 8,220,539 B2 | 7/2012 | Vinegar et al. |
| 8,224,164 B2 | 7/2012 | Sandberg et al. |
| 8,224,165 B2 | 7/2012 | Vinegar et al. |
| 8,225,866 B2 | 7/2012 | de Rouffignac |
| 8,230,927 B2 | 7/2012 | Fairbanks et al. |
| 8,233,782 B2 | 7/2012 | Vinegar et al. |
| 8,238,730 B2 | 8/2012 | Sandberg et al. |
| 8,256,512 B2 | 9/2012 | Stanecki |
| 8,257,112 B2 | 9/2012 | Tilley |
| 8,261,832 B2 | 9/2012 | Ryan |
| 8,267,170 B2 | 9/2012 | Fowler et al. |
| 8,276,661 B2 | 10/2012 | Costello et al. |
| 8,281,861 B2 | 10/2012 | Nguyen et al. |
| 8,327,932 B2 | 12/2012 | Karanikas |
| 8,353,347 B2 | 1/2013 | Mason |
| 8,355,623 B2 | 1/2013 | Vinegar et al. |
| 8,356,935 B2 | 1/2013 | Arora et al. |
| 8,381,806 B2 | 2/2013 | Menotti |
| 8,381,815 B2 | 2/2013 | Karanikas et al. |
| 8,434,555 B2 | 5/2013 | Bos et al. |
| 8,450,540 B2 | 5/2013 | Roes et al. |
| 8,459,359 B2 | 6/2013 | Vinegar |
| 8,485,252 B2 | 7/2013 | de Rouffignac et al. |
| 8,485,256 B2 | 7/2013 | Bass et al. |
| 8,485,847 B2 | 7/2013 | Tilley |
| 8,502,120 B2 | 8/2013 | Bass et al. |
| 8,536,497 B2 | 9/2013 | Kim |
| 8,555,971 B2 | 10/2013 | Vinegar et al. |
| 8,562,078 B2 | 10/2013 | Burns et al. |
| 8,606,091 B2 | 12/2013 | John et al. |
| 8,627,887 B2 | 1/2014 | Vinegar et al. |
| 8,631,866 B2 | 1/2014 | Nguyen |
| 8,636,323 B2 | 1/2014 | Prince-Wright et al. |
| 8,662,175 B2 | 3/2014 | Karanikas et al. |
| 2002/0027001 A1 | 3/2002 | Wellington et al. |
| 2002/0028070 A1 | 3/2002 | Holen |
| 2002/0033253 A1 | 3/2002 | de Rouffignac et al. |
| 2002/0036089 A1 | 3/2002 | Vinegar et al. |
| 2002/0038069 A1 | 3/2002 | Wellington et al. |
| 2002/0040779 A1 | 4/2002 | Wellington et al. |
| 2002/0040780 A1 | 4/2002 | Wellington et al. |
| 2002/0053431 A1 | 5/2002 | Wellington et al. |
| 2002/0076212 A1 | 6/2002 | Zhang et al. |
| 2003/0066642 A1 | 4/2003 | Wellington et al. |
| 2003/0079877 A1 | 5/2003 | Wellington et al. |
| 2003/0085034 A1 | 5/2003 | Wellington et al. |
| 2003/0146002 A1 | 8/2003 | Vinegar et al. |
| 2003/0196789 A1 | 10/2003 | Wellington et al. |
| 2003/0201098 A1 | 10/2003 | Karanikas et al. |
| 2004/0163801 A1 | 8/2004 | Dalrymple |
| 2005/0006128 A1 | 1/2005 | Mita et al. |
| 2005/0269313 A1 | 12/2005 | Vinegar |
| 2006/0289536 A1 | 12/2006 | Vinegar |
| 2007/0127897 A1 | 6/2007 | John et al. |
| 2007/0173122 A1 | 7/2007 | Matsuoka |
| 2008/0073104 A1 | 3/2008 | Barberree et al. |
| 2008/0135244 A1 | 6/2008 | Miller |
| 2009/0071652 A1 | 3/2009 | Vinegar |
| 2009/0095478 A1 | 4/2009 | Karanikas et al. |
| 2009/0095479 A1 | 4/2009 | Karanikas et al. |
| 2009/0120646 A1 | 5/2009 | Kim et al. |
| 2009/0126929 A1 | 5/2009 | Vinegar |
| 2009/0189617 A1 | 7/2009 | Burns et al. |
| 2009/0194524 A1 | 8/2009 | Kim et al. |
| 2009/0200290 A1 | 8/2009 | Cardinal et al. |
| 2009/0321417 A1 | 12/2009 | Burns et al. |
| 2010/0038112 A1 | 2/2010 | Grether |
| 2010/0044781 A1 | 2/2010 | Tanabe |
| 2010/0071903 A1 | 3/2010 | Prince-Wright et al. |
| 2010/0089584 A1 | 4/2010 | Burns |
| 2010/0096137 A1 | 4/2010 | Nguyen et al. |
| 2010/0108379 A1 | 5/2010 | Edbury et al. |
| 2010/0126727 A1* | 5/2010 | Vinegar et al. ............... 166/302 |
| 2010/0147521 A1 | 6/2010 | Xie et al. |
| 2010/0147522 A1 | 6/2010 | Xie et al. |
| 2010/0155070 A1 | 6/2010 | Roes et al. |
| 2010/0190649 A1 | 7/2010 | Doll et al. |
| 2010/0224368 A1 | 9/2010 | Mason |
| 2010/0258265 A1 | 10/2010 | Karanikas et al. |
| 2010/0258290 A1 | 10/2010 | Bass |
| 2010/0258291 A1 | 10/2010 | de St. Remey et al. |
| 2011/0042084 A1 | 2/2011 | Bos et al. |
| 2011/0124228 A1 | 5/2011 | Coles et al. |

(56) References Cited

U.S. PATENT DOCUMENTS

| | | | |
|---|---|---|---|
| 2011/0132661 A1 | 6/2011 | Harmason et al. | |
| 2011/0134958 A1 | 6/2011 | Arora et al. | |
| 2011/0220394 A1* | 9/2011 | Szylakowski et al. | .... 174/137 B |
| 2011/0247805 A1 | 10/2011 | de St. Remey et al. | |
| 2011/0247817 A1 | 10/2011 | Bass et al. | |
| 2011/0247818 A1 | 10/2011 | Bass et al. | |
| 2011/0248018 A1 | 10/2011 | Bass et al. | |
| 2012/0084978 A1 | 4/2012 | Hartford et al. | |
| 2012/0085564 A1 | 4/2012 | D'Angelo III et al. | |
| 2012/0090174 A1 | 4/2012 | Harmason et al. | |
| 2012/0110845 A1 | 5/2012 | Burns et al. | |
| 2012/0118634 A1 | 5/2012 | Coles et al. | |
| 2012/0193099 A1 | 8/2012 | Vinegar et al. | |
| 2012/0255772 A1 | 10/2012 | D'Angelo, III et al. | |

FOREIGN PATENT DOCUMENTS

| | | |
|---|---|---|
| CA | 1288043 | 8/1991 |
| EP | 107927 | 5/1984 |
| EP | 130671 | 9/1985 |
| GB | 676543 | 7/1952 |
| GB | 1010023 | 11/1965 |
| GB | 1204405 | 9/1970 |
| JP | 2000340350 | 12/2000 |
| WO | 97/23924 | 7/1997 |
| WO | 00/19061 | 4/2000 |

OTHER PUBLICATIONS

U.S. Patent and Trademark Office, Office Communication for co-pending U.S. Appl. No. 12/576,772; mailed Oct. 13, 2011.
U.S. Patent and Trademark Office, Office Communication for U.S. Appl. No. 12/106,065; mailed Nov. 28, 2011.
McGee et al. "Electrical Heating with Horizontal Wells, The Heat Transfer Problem," International Conference on Horizontal Well Tehcnology, Calgary, Alberta Canada, 1996; 14 pages.
"IEEE Recommended Practice for Electrical Impedance, Induction, and Skin Effect Heating of Pipelines and Vessels," IEEE Std. 844-200, 2000; 6 pages.
Swedish shale oil—Production methods in Sweden, Organisation for European Economic Cooperation, 1952, (70 pages).
Bosch et al. "Evaluation of Downhole Electric Impedance Heating Systems for Paraffin Control in Oil Wells," IEEE Transactions on Industrial Applications, 1992, vol. 28; pp. 190-194.
Bosch et al., "Evaluation of Downhole Electric Impedance Heating Systems for Paraffin Control in Oil Wells," Industry Applications Society 37th Annual Petroleum and Chemical Industry Conference; The Institute of Electrical and Electronics Engineers Inc., Sep. 1990, pp. 223-227.
Rangel-German et al., "Electrical-Heating-Assisted Recovery for Heavy Oil", pp. 1-43. 2004.
Kovscek, Anthony R., "Reservoir Engineering analysis of Novel Thermal Oil Recovery Techniques applicable to Alaskan North Slope Heavy Oils", pp. 1-6.
Boggs, "The Case for Frequency Domain PD Testing in the Context of Distribution Cable", Electrical Insulation Magazine, IEEE, vol. 19, Issue 4, Jul.-Aug. 2003, pp. 13-19.
U.S. Patent and Trademark Office, Office Communication for U.S. Appl. No. 11/788,869; mailed May 4, 2012.
U.S. Patent and Trademark Office, Office Communication for U.S. Appl. No. 12/576,772; mailed May 1, 2012.
U.S. Patent and Trademark Office, Office Communication for U.S. Appl. No. 12/106,065; mailed Jun. 27, 2012.
U.S. Patent and Trademark Office, Office Communication for U.S. Appl. No. 12/757,650; mailed Jul. 19, 2012.
U.S. Patent and Trademark Office, Office Communication for U.S. Appl. No. 12/901,237; mailed Aug. 2, 2012.
U.S. Patent and Trademark Office, Office Communication for U.S. Appl. No. 12/901,231; mailed Dec. 19, 2012.
U.S. Patent and Trademark Office, Office Communication for U.S. Appl. No. 12/106,139; mailed Jul. 21, 2010.
U.S. Patent and Trademark Office, Office Communication for U.S. Appl. No. 12/106,139; mailed Jan. 19, 2011.
U.S. Patent and Trademark Office, Office Communication for U.S. Appl. No. 12/106,139; mailed Oct. 6, 2011.
U.S. Patent and Trademark Office, Office Communication for U.S. Appl. No. 12/106,139; mailed Apr. 10, 2012.
U.S. Patent and Trademark Office, Office Communication for U.S. Appl. No. 13/083,169; mailed Sep. 11, 2012.
U.S. Patent and Trademark Office, "Office Communication," for U.S. Appl. No. 11/113,353 mailed Jul. 25, 2008.
U.S. Patent and Trademark Office, "Office Communication," for U.S. Appl. No. 11/113,353 mailed Nov. 18, 2008.
U.S. Patent and Trademark Office, "Office Communication," for U.S. Appl. No. 11/113,353 mailed Sep. 20, 2012.
U.S. Patent and Trademark Office, "Office Communication," for U.S. Appl. No. 11/584,801 mailed Oct. 27, 2009.
U.S. Patent and Trademark Office, "Office Communication," for U.S. Appl. No. 11,584,801 mailed Aug. 11, 2008.
U.S. Patent and Trademark Office, "Office Communication," for U.S. Appl. No. 11/584,801 mailed Jan. 11, 2008; 7 pages.
U.S. Patent and Trademark Office, Office Communication for U.S. Appl. No. 12/250,346; mailed Sep. 5, 2012.
U.S. Patent and Trademark Office, Office Communication for U.S. Appl. No. 12/250,303; mailed Aug. 16, 2011.
U.S. Patent and Trademark Office, Office Communication for U.S. Appl. No. 12/250,303; mailed Mar. 8, 2012.
Burnham, Alan, K. "Oil Shale Retorting Dependence of timing and composition on temperature and heating rate", Jan. 27, 1995, (23 pages).
Hill et al., "The Characteristics of a Low Temperature in situ Shale Oil" American Institute of Mining, Metallurgical & Petroleum Engineers, 1967 (pp. 75-90).
Kinetics of Low-Temperature Pyrolysis of Oil Shale by the IITRI RF Process, Sresty et al.; 15th Oil Shale Symposium, Colorado School of Mines, Apr. 1982 pp. 1-13.
Kinetic Analysis of California Oil Shale by Programmed Temperature Microphyrolysis, John G. Reynolds & Alan K. Burnham, Dec. 9, 1991 (14 pages).

* cited by examiner

SYSTEM AND METHODS FOR USING DIELECTRIC PROPERTIES OF AN INSULATED CONDUCTOR IN A SUBSURFACE FORMATION TO ASSESS PROPERTIES OF THE INSULATED CONDUCTOR

PRIORITY CLAIM

This patent claims priority to U.S. Provisional Patent Application No. 61/544,824 to Burns et al., entitled "USING DIELECTRIC PROPERTIES OF AN INSULATED CONDUCTOR HEATER IN A SUBSURFACE FORMATION TO ASSESS PROPERTIES OF THE HEATER", filed Oct. 7, 2011, which is incorporated by reference in its entirety.

RELATED PATENTS

This patent application incorporates by reference in its entirety each of U.S. Pat. No. 6,688,387 to Wellington et al.; U.S. Pat. No. 6,991,036 to Sumnu-Dindoruk et al.; U.S. Pat. No. 6,698,515 to Karanikas et al.; U.S. Pat. No. 6,880,633 to Wellington et al.; U.S. Pat. No. 6,782,947 to de Rouffignac et al.; U.S. Pat. No. 6,991,045 to Vinegar et al.; U.S. Pat. No. 7,073,578 to Vinegar et al.; U.S. Pat. No. 7,121,342 to Vinegar et al.; U.S. Pat. No. 7,320,364 to Fairbanks; U.S. Pat. No. 7,527,094 to McKinzie et al.; U.S. Pat. No. 7,584,789 to Mo et al.; U.S. Pat. No. 7,533,719 to Hinson et al.; U.S. Pat. No. 7,562,707 to Miller; and U.S. Pat. No. 7,798,220 to Vinegar et al.; U.S. Patent Application Publication Nos. 2009-0189617 to Burns et al.; 2010-0071903 to Prince-Wright et al.; 2010-0096137 to Nguyen et al.; 2010-0258265 to Karanikas et al.; and 2011-0134958 to Arora et al.

BACKGROUND

1. Field of the Invention

The present invention relates generally to methods and systems for production of hydrocarbons, hydrogen, and/or other products from various subsurface formations such as hydrocarbon containing formations.

2. Description of Related Art

Hydrocarbons obtained from subterranean formations are often used as energy resources, as feedstocks, and as consumer products. Concerns over depletion of available hydrocarbon resources and concerns over declining overall quality of produced hydrocarbons have led to development of processes for more efficient recovery, processing and/or use of available hydrocarbon resources. In situ processes may be used to remove hydrocarbon materials from subterranean formations that were previously inaccessible and/or too expensive to extract using available methods. Chemical and/or physical properties of hydrocarbon material in a subterranean formation may need to be changed to allow hydrocarbon material to be more easily removed from the subterranean formation and/or increase the value of the hydrocarbon material. The chemical and physical changes may include in situ reactions that produce removable fluids, composition changes, solubility changes, density changes, phase changes, and/or viscosity changes of the hydrocarbon material in the formation.

Large deposits of heavy hydrocarbons (heavy oil and/or tar) contained in relatively permeable formations (for example in tar sands) are found in North America, South America, Africa, and Asia. Tar can be surface-mined and upgraded to lighter hydrocarbons such as crude oil, naphtha, kerosene, and/or gas oil. Surface milling processes may further separate the bitumen from sand. The separated bitumen may be converted to light hydrocarbons using conventional refinery methods. Mining and upgrading tar sand is usually substantially more expensive than producing lighter hydrocarbons from conventional oil reservoirs.

Typical temperature measurement methods may be difficult and/or expensive to implement for use in assessing a temperature profile of a heater located in a subsurface formation for heating in an in situ heat treatment process. The desire is for a temperature profile that includes multiple temperatures along the length or a portion of the heater in the subsurface formation. Thermocouples are one possible solution; however, thermocouples provide only one temperature at one location and two wires are generally needed for each thermocouple. Thus, to obtain a temperature profile along a length of the heater, multiple pairs of wires are needed. In some cases, the wellbore for the heater may not be large enough to accommodate the number of wires needed for adequate temperature monitoring. The risk of failure of one or more of the thermocouples (or their associated wires) is increased with the use of multiple wires in the subsurface wellbore. In addition, thermocouples installed in high temperature applications (>300° C.) may suffer from a phenomenon known as temperature measurement drift. Temperature measurement drift may be a significant source of error.

Another possible solution is the use of a fiber optic cable temperature sensor system. The fiber optic cable system provides a temperature profile along a length of the heater. Commercially available fiber optic cable systems, however, typically only have operating temperature ranges up to about 300° C. and are susceptible to mechanical damage because of the softening of the fiber and/or fiber coatings resulting in the various materials adhering to each other. Thus, these systems are not suitable for measurement of higher temperatures encountered while heating the subsurface formation during the in situ heat treatment process. Some experimental fiber optic cable systems are suitable for use at these higher temperatures but these systems may be too expensive for implementation in a commercial process (for example, a large field of heaters). Thus, there is a need for a simple, inexpensive system that allows temperature assessment at one or more locations along a length of the subsurface heater used in the in situ heat treatment process.

SUMMARY

Embodiments described herein generally relate to systems, methods, and heaters for treating a subsurface formation. Embodiments described herein also generally relate to heaters that have novel components therein. Such heaters can be obtained by using the systems and methods described herein.

In certain embodiments, the invention provides one or more systems, methods, and/or heaters. In some embodiments, the systems, methods, and/or heaters are used for treating a subsurface formation.

In certain embodiments, a system for assessing one or more temperatures along an insulated conductor in an opening in a subsurface formation, includes: an insulated conductor with a length comprising at least two sections of insulation with different capacitances, wherein the sections with the different capacitances comprise different takeoff temperatures for at least one dielectric property of the insulation.

In certain embodiments, a method for assessing a temperature in an opening in a subsurface formation, includes: assessing at least one dielectric property along a length of an insulated conductor located in the opening, wherein the length of the insulated conductor comprises at least two sections of insulation with different capacitances, wherein the sections with the different capacitances comprise different takeoff temperatures for the at least one dielectric property; and assessing a temperature of the length of the insulated conductor to be one of the different takeoff temperatures when the takeoff temperature of at least one of the sections is reached.

In certain embodiments, a method for providing heat to a subsurface formation using an insulated conductor heater located in an opening in the formation, includes: assessing a correlation between one or more dielectric properties of insulation in the insulated conductor heater and water content in the heater; providing power to the heater to provide heat to the formation; assessing one or more of the dielectric properties along a length of the heater; and assessing the water content in the heater.

In certain embodiments, a method for assessing heat flow in a pattern of insulated conductor heaters, includes: assessing one or more dielectric properties along lengths of a plurality of insulated conductor heaters in the pattern of heaters; assessing one or more differences in temperature between the insulated conductor heaters based on the assessed dielectric properties; and providing an image of heat flow in the pattern of heaters based on the assessed differences in temperatures.

In further embodiments, features from specific embodiments may be combined with features from other embodiments. For example, features from one embodiment may be combined with features from any of the other embodiments.

In further embodiments, treating a subsurface formation is performed using any of the methods, systems, or heaters described herein.

In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings in which.

Figure 1:
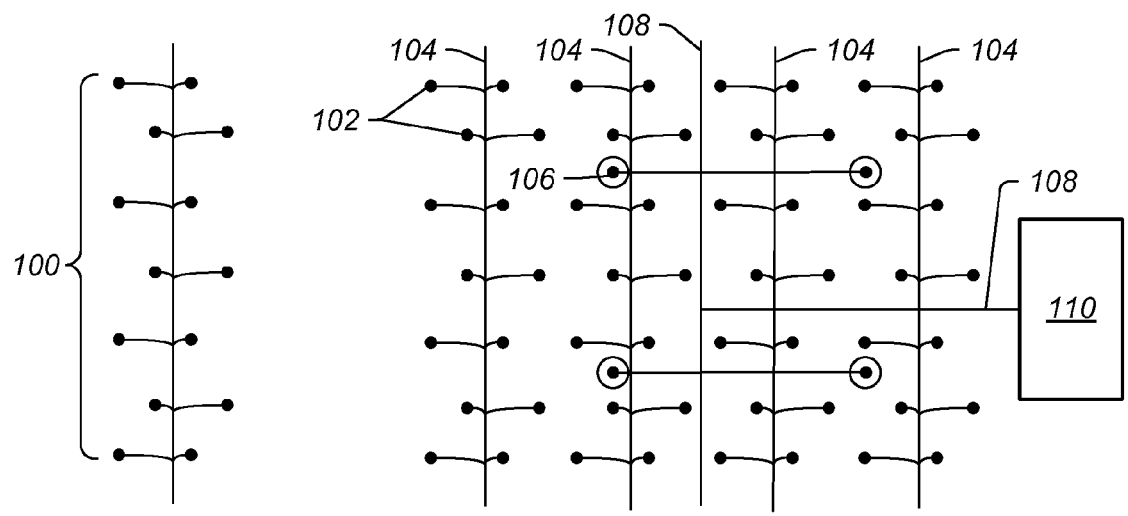
FIG. 1 shows a schematic view of an embodiment of a portion of an in situ heat treatment system for treating a hydrocarbon containing formation.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

The following description generally relates to systems and methods for treating hydrocarbons in the formations. Such formations may be treated to yield hydrocarbon products, hydrogen, and other products.

"Alternating current (AC)" refers to a time-varying current that reverses direction substantially sinusoidally. AC produces skin effect electricity flow in a ferromagnetic conductor.

"Annular region" is the region between an outer conduit and an inner conduit positioned in the outer conduit.

"API gravity" refers to API gravity at 15.5° C. (60° F.). API gravity is as determined by ASTM Method D6822 or ASTM Method D1298.

"ASTM" refers to American Standard Testing and Materials.

In the context of reduced heat output heating systems, apparatus, and methods, the term "automatically" means such systems, apparatus, and methods function in a certain way without the use of external control (for example, external controllers such as a controller with a temperature sensor and a feedback loop, PID controller, or predictive controller).

"Asphalt/bitumen" refers to a semi-solid, viscous material soluble in carbon disulfide. Asphalt/bitumen may be obtained from refining operations or produced from subsurface formations.

"Condensable hydrocarbons" are hydrocarbons that condense at 25° C. and one atmosphere absolute pressure. Condensable hydrocarbons may include a mixture of hydrocarbons having carbon numbers greater than 4. "Non-condensable hydrocarbons" are hydrocarbons that do not condense at 25° C. and one atmosphere absolute pressure. Non-condensable hydrocarbons may include hydrocarbons having carbon numbers less than 5.

"Coupled" means either a direct connection or an indirect connection (for example, one or more intervening connections) between one or more objects or components. The phrase "directly connected" means a direct connection between objects or components such that the objects or components are connected directly to each other so that the objects or components operate in a "point of use" manner.

"Curie temperature" is the temperature above which a ferromagnetic material loses all of its ferromagnetic properties. In addition to losing all of its ferromagnetic properties above the Curie temperature, the ferromagnetic material begins to lose its ferromagnetic properties when an increasing electrical current is passed through the ferromagnetic material.

"Diad" refers to a group of two items (for example, heaters, wellbores, or other objects) coupled together.

A "fluid" may be, but is not limited to, a gas, a liquid, an emulsion, a slurry, and/or a stream of solid particles that has flow characteristics similar to liquid flow.

A "formation" includes one or more hydrocarbon containing layers, one or more non-hydrocarbon layers, an overburden, and/or an underburden. "Hydrocarbon layers" refer to layers in the formation that contain hydrocarbons. The hydrocarbon layers may contain non-hydrocarbon material and hydrocarbon material. The "overburden" and/or the "underburden" include one or more different types of impermeable materials. For example, the overburden and/or underburden may include rock, shale, mudstone, or wet/tight carbonate. In some embodiments of in situ heat treatment processes, the overburden and/or the underburden may include a hydrocarbon containing layer or hydrocarbon containing layers that are relatively impermeable and are not subjected to temperatures during in situ heat treatment processing that result in significant characteristic changes of the hydrocarbon containing layers of the overburden and/or the underburden. For example, the underburden may contain shale or mudstone, but the underburden is not allowed to heat to pyrolysis temperatures during the in situ heat treatment process. In some cases, the overburden and/or the underburden may be somewhat permeable.

"Formation fluids" refer to fluids present in a formation and may include pyrolyzation fluid, synthesis gas, mobilized hydrocarbons, and water (steam). Formation fluids may include hydrocarbon fluids as well as non-hydrocarbon fluids. The term "mobilized fluid" refers to fluids in a hydrocarbon containing formation that are able to flow as a result of thermal treatment of the formation. "Produced fluids" refer to fluids removed from the formation.

A "heat source" is any system for providing heat to at least a portion of a formation substantially by conductive and/or radiative heat transfer. For example, a heat source may include electrically conducting materials and/or electric heaters such as an insulated conductor, an elongated member, and/or a conductor disposed in a conduit. A heat source may also include systems that generate heat by burning a fuel external to or in a formation. The systems may be surface burners, downhole gas burners, flameless distributed combustors, and natural distributed combustors. In some embodiments, heat provided to or generated in one or more heat sources may be supplied by other sources of energy. The other sources of energy may directly heat a formation, or the energy may be applied to a transfer medium that directly or indirectly heats the formation. It is to be understood that one or more heat sources that are applying heat to a formation may use different sources of energy. Thus, for example, for a given formation some heat sources may supply heat from electrically conducting materials or electric resistance heaters. Some heat sources may provide heat from combustion and some heat sources may provide heat from one or more other energy sources (for example, chemical reactions, solar energy, wind energy, biomass, or other sources of renewable energy). A chemical reaction may include an exothermic reaction (for example, an oxidation reaction). A heat source may also include an electrically conducting material and/or a heater that provides heat to a zone proximate and/or surrounding a heating location such as a heater well.

A "heater" is any system or heat source for generating heat in a well or a near wellbore region. Heaters may be, but are not limited to, electric heaters, burners, combustors that react with material in or produced from a formation, and/or combinations thereof.

"Heavy hydrocarbons" are viscous hydrocarbon fluids. Heavy hydrocarbons may include highly viscous hydrocarbon fluids such as heavy oil, tar, and/or asphalt. Heavy hydrocarbons may include carbon and hydrogen, as well as smaller concentrations of sulfur, oxygen, and nitrogen. Additional elements may also be present in heavy hydrocarbons in trace amounts. Heavy hydrocarbons may be classified by API gravity. Heavy hydrocarbons generally have an API gravity below about 20°. Heavy oil, for example, generally has an API gravity of about 10-20°, whereas tar generally has an API gravity below about 10°. The viscosity of heavy hydrocarbons is generally greater than about 100 centipoise at 15° C. Heavy hydrocarbons may include aromatics or other complex ring hydrocarbons.

Heavy hydrocarbons may be found in a relatively permeable formation. The relatively permeable formation may include heavy hydrocarbons entrained in, for example, sand or carbonate. "Relatively permeable" is defined, with respect to formations or portions thereof, as an average permeability of 10 millidarcy or more (for example, 10 or 100 millidarcy). "Relatively low permeability" is defined, with respect to formations or portions thereof, as an average permeability of less than about 10 millidarcy. One darcy is equal to about 0.99 square micrometers. An impermeable layer generally has a permeability of less than about 0.1 millidarcy.

Certain types of formations that include heavy hydrocarbons may also include, but are not limited to, natural mineral waxes or natural asphaltites. "Natural mineral waxes" typically occur in substantially tubular veins that may be several meters wide, several kilometers long, and hundreds of meters deep. "Natural asphaltites" include solid hydrocarbons of an aromatic composition and typically occur in large veins. In situ recovery of hydrocarbons from formations such as natural mineral waxes and natural asphaltites may include melting to form liquid hydrocarbons and/or solution mining of hydrocarbons from the formations.

"Hydrocarbons" are generally defined as molecules formed primarily by carbon and hydrogen atoms. Hydrocarbons may also include other elements such as, but not limited to, halogens, metallic elements, nitrogen, oxygen, and/or sulfur. Hydrocarbons may be, but are not limited to, kerogen, bitumen, pyrobitumen, oils, natural mineral waxes, and asphaltites. Hydrocarbons may be located in or adjacent to mineral matrices in the earth. Matrices may include, but are not limited to, sedimentary rock, sands, silicilytes, carbonates, diatomites, and other porous media. "Hydrocarbon fluids" are fluids that include hydrocarbons. Hydrocarbon fluids may include, entrain, or be entrained in non-hydrocarbon fluids such as hydrogen, nitrogen, carbon monoxide, carbon dioxide, hydrogen sulfide, water, and ammonia.

An "in situ conversion process" refers to a process of heating a hydrocarbon containing formation from heat sources to raise the temperature of at least a portion of the formation above a pyrolysis temperature so that pyrolyzation fluid is produced in the formation.

An "in situ heat treatment process" refers to a process of heating a hydrocarbon containing formation with heat sources to raise the temperature of at least a portion of the formation above a temperature that results in mobilized fluid, visbreaking, and/or pyrolysis of hydrocarbon containing material so that mobilized fluids, visbroken fluids, and/or pyrolyzation fluids are produced in the formation.

"Insulated conductor" refers to any elongated material that is able to conduct electricity and that is covered, in whole or in part, by an electrically insulating material.

"Kerogen" is a solid, insoluble hydrocarbon that has been converted by natural degradation and that principally contains carbon, hydrogen, nitrogen, oxygen, and sulfur. Coal and oil shale are typical examples of materials that contain kerogen. "Bitumen" is a non-crystalline solid or viscous hydrocarbon material that is substantially soluble in carbon disulfide. "Oil" is a fluid containing a mixture of condensable hydrocarbons.

"Modulated direct current (DC)" refers to any substantially non-sinusoidal time-varying current that produces skin effect electricity flow in a ferromagnetic conductor.

"Phase transformation temperature" of a ferromagnetic material refers to a temperature or a temperature range during which the material undergoes a phase change (for example, from ferrite to austenite) that decreases the magnetic permeability of the ferromagnetic material. The reduction in magnetic permeability is similar to reduction in magnetic permeability due to the magnetic transition of the ferromagnetic material at the Curie temperature.

"Pyrolysis" is the breaking of chemical bonds due to the application of heat. For example, pyrolysis may include transforming a compound into one or more other substances by heat alone. Heat may be transferred to a section of the formation to cause pyrolysis.

"Pyrolyzation fluids" or "pyrolysis products" refers to fluid produced substantially during pyrolysis of hydrocarbons. Fluid produced by pyrolysis reactions may mix with other fluids in a formation. The mixture would be considered pyrolyzation fluid or pyrolyzation product. As used herein, "pyrolysis zone" refers to a volume of a formation (for example, a relatively permeable formation such as a tar sands formation) that is reacted or reacting to form a pyrolyzation fluid.

"Subsidence" is a downward movement of a portion of a formation relative to an initial elevation of the surface.

"Superposition of heat" refers to providing heat from two or more heat sources to a selected section of a formation such that the temperature of the formation at least at one location between the heat sources is influenced by the heat sources.

"Tar" is a viscous hydrocarbon that generally has a viscosity greater than about 10,000 centipoise at 15° C. The specific gravity of tar generally is greater than 1.000. Tar may have an API gravity less than 10°.

A "tar sands formation" is a formation in which hydrocarbons are predominantly present in the form of heavy hydrocarbons and/or tar entrained in a mineral grain framework or other host lithology (for example, sand or carbonate). Examples of tar sands formations include formations such as the Athabasca formation, the Grosmont formation, and the Peace River formation, all three in Alberta, Canada; and the Faja formation in the Orinoco belt in Venezuela.

"Temperature limited heater" generally refers to a heater that regulates heat output (for example, reduces heat output) above a specified temperature without the use of external controls such as temperature controllers, power regulators, rectifiers, or other devices. Temperature limited heaters may be AC (alternating current) or modulated (for example, "chopped") DC (direct current) powered electrical resistance heaters.

"Thermally conductive fluid" includes fluid that has a higher thermal conductivity than air at standard temperature and pressure (STP) (0° C. and 101.325 kPa).

"Thermal conductivity" is a property of a material that describes the rate at which heat flows, in steady state, between two surfaces of the material for a given temperature difference between the two surfaces.

"Thermal fracture" refers to fractures created in a formation caused by expansion or contraction of a formation and/or fluids in the formation, which is in turn caused by increasing/decreasing the temperature of the formation and/or fluids in the formation, and/or by increasing/decreasing a pressure of fluids in the formation due to heating.

"Thickness" of a layer refers to the thickness of a cross section of the layer, wherein the cross section is normal to a face of the layer.

"Time-varying current" refers to electrical current that produces skin effect electricity flow in a ferromagnetic conductor and has a magnitude that varies with time. Time-varying current includes both alternating current (AC) and modulated direct current (DC).

"Triad" refers to a group of three items (for example, heaters, wellbores, or other objects) coupled together.

"Turndown ratio" for the temperature limited heater in which current is applied directly to the heater is the ratio of the highest AC or modulated DC resistance below the Curie temperature to the lowest resistance above the Curie temperature for a given current. Turndown ratio for an inductive heater is the ratio of the highest heat output below the Curie temperature to the lowest heat output above the Curie temperature for a given current applied to the heater.

A "u-shaped wellbore" refers to a wellbore that extends from a first opening in the formation, through at least a portion of the formation, and out through a second opening in the formation. In this context, the wellbore may be only roughly in the shape of a "v" or "u", with the understanding that the "legs" of the "u" do not need to be parallel to each other, or perpendicular to the "bottom" of the "u" for the wellbore to be considered "u-shaped".

"Upgrade" refers to increasing the quality of hydrocarbons. For example, upgrading heavy hydrocarbons may result in an increase in the API gravity of the heavy hydrocarbons.

"Visbreaking" refers to the untangling of molecules in fluid during heat treatment and/or to the breaking of large molecules into smaller molecules during heat treatment, which results in a reduction of the viscosity of the fluid.

"Viscosity" refers to kinematic viscosity at 40° C. unless otherwise specified. Viscosity is as determined by ASTM Method D445.

The term "wellbore" refers to a hole in a formation made by drilling or insertion of a conduit into the formation. A wellbore may have a substantially circular cross section, or another cross-sectional shape. As used herein, the terms "well" and "opening," when referring to an opening in the formation may be used interchangeably with the term "wellbore."

A formation may be treated in various ways to produce many different products. Different stages or processes may be used to treat the formation during an in situ heat treatment process. In some embodiments, one or more sections of the formation are solution mined to remove soluble minerals from the sections. Solution mining minerals may be performed before, during, and/or after the in situ heat treatment process. In some embodiments, the average temperature of one or more sections being solution mined may be maintained below about 120° C.

In some embodiments, one or more sections of the formation are heated to remove water from the sections and/or to remove methane and other volatile hydrocarbons from the sections. In some embodiments, the average temperature may be raised from ambient temperature to temperatures below about 220° C. during removal of water and volatile hydrocarbons.

In some embodiments, one or more sections of the formation are heated to temperatures that allow for movement and/or visbreaking of hydrocarbons in the formation. In some embodiments, the average temperature of one or more sections of the formation are raised to mobilization temperatures of hydrocarbons in the sections (for example, to temperatures ranging from 100° C. to 250° C., from 120° C. to 240° C., or from 150° C. to 230° C.).

In some embodiments, one or more sections are heated to temperatures that allow for pyrolysis reactions in the formation. In some embodiments, the average temperature of one or more sections of the formation may be raised to pyrolysis temperatures of hydrocarbons in the sections (for example, temperatures ranging from 230° C. to 900° C., from 240° C. to 400° C. or from 250° C. to 350° C.).

Heating the hydrocarbon containing formation with a plurality of heat sources may establish thermal gradients around the heat sources that raise the temperature of hydrocarbons in the formation to desired temperatures at desired heating rates. The rate of temperature increase through the mobilization temperature range and/or the pyrolysis temperature range for desired products may affect the quality and quantity of the formation fluids produced from the hydrocarbon containing formation. Slowly raising the temperature of the formation through the mobilization temperature range and/or pyrolysis temperature range may allow for the production of high quality, high API gravity hydrocarbons from the formation. Slowly raising the temperature of the formation through the mobilization temperature range and/or pyrolysis temperature range may allow for the removal of a large amount of the hydrocarbons present in the formation as hydrocarbon product.

In some in situ heat treatment embodiments, a portion of the formation is heated to a desired temperature instead of slowly heating the temperature through a temperature range. In some embodiments, the desired temperature is 300° C., 325° C., or 350° C. Other temperatures may be selected as the desired temperature.

Superposition of heat from heat sources allows the desired temperature to be relatively quickly and efficiently established in the formation. Energy input into the formation from the heat sources may be adjusted to maintain the temperature in the formation substantially at a desired temperature.

Mobilization and/or pyrolysis products may be produced from the formation through production wells. In some embodiments, the average temperature of one or more sections is raised to mobilization temperatures and hydrocarbons are produced from the production wells. The average temperature of one or more of the sections may be raised to pyrolysis temperatures after production due to mobilization decreases below a selected value. In some embodiments, the average temperature of one or more sections may be raised to pyrolysis temperatures without significant production before reaching pyrolysis temperatures. Formation fluids including pyrolysis products may be produced through the production wells.

In some embodiments, the average temperature of one or more sections may be raised to temperatures sufficient to allow synthesis gas production after mobilization and/or pyrolysis. In some embodiments, hydrocarbons may be raised to temperatures sufficient to allow synthesis gas production without significant production before reaching the temperatures sufficient to allow synthesis gas production. For example, synthesis gas may be produced in a temperature range from about 400° C. to about 1200° C., about 500° C. to about 1100° C., or about 550° C. to about 1000° C. A synthesis gas generating fluid (for example, steam and/or water) may be introduced into the sections to generate synthesis gas. Synthesis gas may be produced from production wells.

Solution mining, removal of volatile hydrocarbons and water, mobilizing hydrocarbons, pyrolyzing hydrocarbons, generating synthesis gas, and/or other processes may be performed during the in situ heat treatment process. In some embodiments, some processes may be performed after the in situ heat treatment process. Such processes may include, but are not limited to, recovering heat from treated sections, storing fluids (for example, water and/or hydrocarbons) in previously treated sections, and/or sequestering carbon dioxide in previously treated sections.

FIG. 1 depicts a schematic view of an embodiment of a portion of the in situ heat treatment system for treating the hydrocarbon containing formation. The in situ heat treatment system may include barrier wells 100. Barrier wells are used to form a barrier around a treatment area. The barrier inhibits fluid flow into and/or out of the treatment area. Barrier wells include, but are not limited to, dewatering wells, vacuum wells, capture wells, injection wells, grout wells, freeze wells, or combinations thereof. In some embodiments, barrier wells 100 are dewatering wells. Dewatering wells may remove liquid water and/or inhibit liquid water from entering a portion of the formation to be heated, or to the formation being heated. As shown, barrier wells 100 extend only along one side of heat sources 102, but the barrier wells typically encircle all heat sources 102 used, or to be used, to heat a treatment area of the formation.

Heat sources 102 are placed in at least a portion of the formation. Heat sources 102 may include heaters such as bare conductors, insulated conductors, conductor-in-conduit heaters, surface burners, flameless distributed combustors, and/or natural distributed combustors. Heat sources 102 may also include other types of heaters. Heat sources 102 provide heat to at least a portion of the formation to heat hydrocarbons in the formation. Energy may be supplied to heat sources 102 through supply lines 104. Supply lines 104 may be structurally different depending on the type of heat source or heat sources used to heat the formation. Supply lines 104 for heat sources may transmit electricity for electric heaters, may transport fuel for combustors, or may transport heat exchange fluid that is circulated in the formation. In some embodiments, electricity for an in situ heat treatment process may be provided by non-carbon based fuel sources (such as green power sources). These fuel sources include nuclear power, wind power, hydro power, biomass power, or fuel cell power plants. The use of green power sources may allow for reduction or elimination of carbon dioxide emissions from the in situ heat treatment process.

When the formation is heated, the heat input into the formation may cause expansion of the formation and geomechanical motion. The heat sources may be turned on before, at the same time, or during a dewatering process. Computer simulations may model formation response to heating. The computer simulations may be used to develop a pattern and time sequence for activating heat sources in the formation so that geomechanical motion of the formation does not adversely affect the functionality of heat sources, production wells, and other equipment in the formation.

Heating the formation may cause an increase in permeability and/or porosity of the formation. Increases in permeability and/or porosity may result from a reduction of mass in the formation due to vaporization and removal of water, removal of hydrocarbons, and/or creation of fractures. Fluid may flow more easily in the heated portion of the formation because of the increased permeability and/or porosity of the formation. Fluid in the heated portion of the formation may move a considerable distance through the formation because of the increased permeability and/or porosity. The considerable distance may be over 1000 m depending on various factors, such as permeability of the formation, properties of the fluid, temperature of the formation, and pressure gradient allowing movement of the fluid. The ability of fluid to travel considerable distance in the formation allows production wells 106 to be spaced relatively far apart in the formation.

Production wells 106 are used to remove formation fluid from the formation. In some embodiments, production well 106 includes a heat source. The heat source in the production well may heat one or more portions of the formation at or near the production well. In some in situ heat treatment process embodiments, the amount of heat supplied to the formation from the production well per meter of the production well is less than the amount of heat applied to the formation from a heat source that heats the formation per meter of the heat source. Heat applied to the formation from the production well may increase formation permeability adjacent to the production well by vaporizing and removing liquid phase fluid adjacent to the production well and/or by increasing the permeability of the formation adjacent to the production well by formation of macro and/or micro fractures.

More than one heat source may be positioned in the production well. A heat source in a lower portion of the production well may be turned off when superposition of heat from adjacent heat sources heats the formation sufficiently to counteract benefits provided by heating the formation with the production well. In some embodiments, the heat source in an upper portion of the production well may remain on after the heat source in the lower portion of the production well is deactivated. The heat source in the upper portion of the well may inhibit condensation and reflux of formation fluid.

In some embodiments, the heat source in production well 106 allows for vapor phase removal of formation fluids from the formation. Providing heating at or through the production well may: (1) inhibit condensation and/or refluxing of production fluid when such production fluid is moving in the production well proximate the overburden, (2) increase heat input into the formation, (3) increase production rate from the production well as compared to a production well without a heat source, (4) inhibit condensation of high carbon number compounds ($C_6$ hydrocarbons and above) in the production well, and/or (5) increase formation permeability at or proximate the production well.

Subsurface pressure in the formation may correspond to the fluid pressure generated in the formation. As temperatures in the heated portion of the formation increase, the pressure in the heated portion may increase as a result of thermal expansion of in situ fluids, increased fluid generation and vaporization of water. Controlling rate of the fluid removal from the formation may allow for control of pressure in the formation. Pressure in the formation may be determined at a number of different locations, such as near or at production wells, near or at heat sources, and near or at monitor wells.

In some hydrocarbon containing formations, production of hydrocarbons from the formation is inhibited until at least some hydrocarbons in the formation have been mobilized and/or pyrolyzed. Formation fluid may be produced from the formation when the formation fluid is of a selected quality. In some embodiments, the selected quality includes an API gravity of at least about 20°, 30°, or 40°. Inhibiting production until at least some hydrocarbons are mobilized and/or pyrolyzed may increase conversion of heavy hydrocarbons to light hydrocarbons. Inhibiting initial production may minimize the production of heavy hydrocarbons from the formation. Production of substantial amounts of heavy hydrocarbons may require expensive equipment and/or reduce the life of production equipment.

In some hydrocarbon containing formations, hydrocarbons in the formation may be heated to mobilization and/or pyrolysis temperatures before substantial permeability has been generated in the heated portion of the formation. An initial lack of permeability may inhibit the transport of generated fluids to production wells 106. During initial heating, fluid pressure in the formation may increase proximate heat sources 102. The increased fluid pressure may be released, monitored, altered, and/or controlled through one or more heat sources 102. For example, selected heat sources 102 or separate pressure relief wells may include pressure relief valves that allow for removal of some fluid from the formation.

In some embodiments, pressure generated by expansion of mobilized fluids, pyrolysis fluids or other fluids generated in the formation may be allowed to increase although an open path to production wells 106 or any other pressure sink may not yet exist in the formation. The fluid pressure may be allowed to increase towards a lithostatic pressure. Fractures in the hydrocarbon containing formation may form when the fluid approaches the lithostatic pressure. For example, fractures may form from heat sources 102 to production wells 106 in the heated portion of the formation. The generation of fractures in the heated portion may relieve some of the pressure in the portion. Pressure in the formation may have to be maintained below a selected pressure to inhibit unwanted production, fracturing of the overburden or underburden, and/or coking of hydrocarbons in the formation.

After mobilization and/or pyrolysis temperatures are reached and production from the formation is allowed, pressure in the formation may be varied to alter and/or control a composition of produced formation fluid, to control a percentage of condensable fluid as compared to non-condensable fluid in the formation fluid, and/or to control an API gravity of formation fluid being produced. For example, decreasing pressure may result in production of a larger condensable fluid component. The condensable fluid component may contain a larger percentage of olefins.

In some in situ heat treatment process embodiments, pressure in the formation may be maintained high enough to promote production of formation fluid with an API gravity of greater than 20°. Maintaining increased pressure in the formation may inhibit formation subsidence during in situ heat treatment. Maintaining increased pressure may reduce or eliminate the need to compress formation fluids at the surface to transport the fluids in collection conduits to treatment facilities.

Maintaining increased pressure in a heated portion of the formation may surprisingly allow for production of large quantities of hydrocarbons of increased quality and of relatively low molecular weight. Pressure may be maintained so that formation fluid produced has a minimal amount of compounds above a selected carbon number. The selected carbon number may be at most 25, at most 20, at most 12, or at most 8. Some high carbon number compounds may be entrained in vapor in the formation and may be removed from the formation with the vapor. Maintaining increased pressure in the formation may inhibit entrainment of high carbon number compounds and/or multi-ring hydrocarbon compounds in the vapor. High carbon number compounds and/or multi-ring hydrocarbon compounds may remain in a liquid phase in the formation for significant time periods. The significant time periods may provide sufficient time for the compounds to pyrolyze to form lower carbon number compounds.

Generation of relatively low molecular weight hydrocarbons is believed to be due, in part, to autogenous generation and reaction of hydrogen in a portion of the hydrocarbon containing formation. For example, maintaining an increased pressure may force hydrogen generated during pyrolysis into the liquid phase within the formation. Heating the portion to a temperature in a pyrolysis temperature range may pyrolyze hydrocarbons in the formation to generate liquid phase pyrolyzation fluids. The generated liquid phase pyrolyzation fluids components may include double bonds and/or radicals. Hydrogen ($H_2$) in the liquid phase may reduce double bonds of the generated pyrolyzation fluids, thereby reducing a potential for polymerization or formation of long chain compounds from the generated pyrolyzation fluids. In addition, $H_2$ may also neutralize radicals in the generated pyrolyzation fluids. $H_2$ in the liquid phase may inhibit the generated pyrolyzation fluids from reacting with each other and/or with other compounds in the formation.

Formation fluid produced from production wells 106 may be transported through collection piping 108 to treatment facilities 110. Formation fluids may also be produced from heat sources 102. For example, fluid may be produced from heat sources 102 to control pressure in the formation adjacent to the heat sources. Fluid produced from heat sources 102 may be transported through tubing or piping to collection piping 108 or the produced fluid may be transported through tubing or piping directly to treatment facilities 110. Treatment facilities 110 may include separation units, reaction units, upgrading units, fuel cells, turbines, storage vessels, and/or other systems and units for processing produced formation fluids. The treatment facilities may form transportation fuel from at least a portion of the hydrocarbons produced from the formation. In some embodiments, the transportation fuel may be jet fuel, such as JP-8.

An insulated conductor may be used as an electric heater element of a heater or a heat source. The insulated conductor may include an inner electrical conductor (core) surrounded by an electrical insulator and an outer electrical conductor (jacket). The electrical insulator may include mineral insulation (for example, magnesium oxide) or other electrical insulation.

In certain embodiments, the insulated conductor is placed in an opening in a hydrocarbon containing formation. In some embodiments, the insulated conductor is placed in an uncased opening in the hydrocarbon containing formation. Placing the insulated conductor in an uncased opening in the hydrocarbon containing formation may allow heat transfer from the insulated conductor to the formation by radiation as well as conduction. Using an uncased opening may facilitate retrieval of the insulated conductor from the well, if necessary.

In some embodiments, an insulated conductor is placed within a casing in the formation; may be cemented within the formation; or may be packed in an opening with sand, gravel, or other fill material. The insulated conductor may be supported on a support member positioned within the opening. The support member may be a cable, rod, or a conduit (for example, a pipe). The support member may be made of a metal, ceramic, inorganic material, or combinations thereof. Because portions of a support member may be exposed to formation fluids and heat during use, the support member may be chemically resistant and/or thermally resistant.

Ties, spot welds, and/or other types of connectors may be used to couple the insulated conductor to the support member at various locations along a length of the insulated conductor. The support member may be attached to a wellhead at an upper surface of the formation. In some embodiments, the insulated conductor has sufficient structural strength such that a support member is not needed. The insulated conductor may, in many instances, have at least some flexibility to inhibit thermal expansion damage when undergoing temperature changes.

In certain embodiments, insulated conductors are placed in wellbores without support members and/or centralizers. An insulated conductor without support members and/or centralizers may have a suitable combination of temperature and corrosion resistance, creep strength, length, thickness (diameter), and metallurgy that will inhibit failure of the insulated conductor during use.

Figure 2:
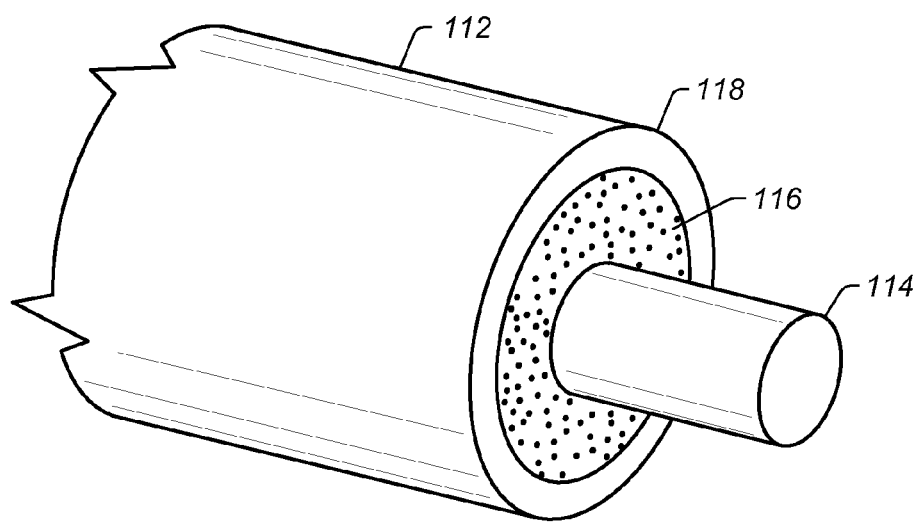
FIG. 2 depicts an embodiment of an insulated conductor heat source.

FIG. 2 depicts a perspective view of an end portion of an embodiment of insulated conductor 112. Insulated conductor 112 may have any desired cross-sectional shape such as, but not limited to, round (depicted in FIG. 2), triangular, ellipsoidal, rectangular, hexagonal, or irregular. In certain embodiments, insulated conductor 112 includes core 114, electrical insulator 116, and jacket 118. Core 114 may resistively heat when an electrical current passes through the core. Alternating or time-varying current and/or direct current may be used to provide power to core 114 such that the core resistively heats.

In some embodiments, electrical insulator 116 inhibits current leakage and arcing to jacket 118. Electrical insulator 116 may thermally conduct heat generated in core 114 to jacket 118. Jacket 118 may radiate or conduct heat to the formation. In certain embodiments, insulated conductor 112 is 1000 m or more in length. Longer or shorter insulated conductors may also be used to meet specific application needs. The dimensions of core 114, electrical insulator 116, and jacket 118 of insulated conductor 112 may be selected such that the insulated conductor has enough strength to be self supporting even at upper working temperature limits. Such insulated conductors may be suspended from wellheads or supports positioned near an interface between an overburden and a hydrocarbon containing formation without the need for support members extending into the hydrocarbon containing formation along with the insulated conductors.

Insulated conductor 112 may be designed to operate at power levels of up to about 1650 watts/meter or higher. In certain embodiments, insulated conductor 112 operates at a power level between about 500 watts/meter and about 1150 watts/meter when heating a formation. Insulated conductor 112 may be designed so that a maximum voltage level at a typical operating temperature does not cause substantial thermal and/or electrical breakdown of electrical insulator 116. Insulated conductor 112 may be designed such that jacket 118 does not exceed a temperature that will result in a significant reduction in corrosion resistance properties of the jacket material. In certain embodiments, insulated conductor 112 may be designed to reach temperatures within a range between about 650° C. and about 900° C. Insulated conductors having other operating ranges may be formed to meet specific operational requirements.

FIG. 2 depicts insulated conductor 112 having a single core 114. In some embodiments, insulated conductor 112 has two or more cores 114. For example, a single insulated conductor may have three cores. Core 114 may be made of metal or another electrically conductive material. The material used to form core 114 may include, but not be limited to, nichrome, copper, nickel, carbon steel, stainless steel, and combinations thereof. In certain embodiments, core 114 is chosen to have a diameter and a resistivity at operating temperatures such that its resistance, as derived from Ohm's law, makes it electrically and structurally stable for the chosen power dissipation per meter, the length of the heater, and/or the maximum voltage allowed for the core material.

In some embodiments, core 114 is made of different materials along a length of insulated conductor 112. For example, a first section of core 114 may be made of a material that has a significantly lower resistance than a second section of the core. The first section may be placed adjacent to a formation layer that does not need to be heated to as high a temperature as a second formation layer that is adjacent to the second section. The resistivity of various sections of core 114 may be adjusted by having a variable diameter and/or by having core sections made of different materials.

Electrical insulator 116 may be made of a variety of materials. Commonly used powders may include, but are not limited to, $MgO$, $Al_2O_3$, $BN$, $Si_3N_4$, Zirconia, BeO, different chemical variations of Spinels, and combinations thereof. $MgO$ may provide good thermal conductivity and electrical insulation properties. The desired electrical insulation properties include low leakage current and high dielectric strength. A low leakage current decreases the possibility of thermal breakdown and the high dielectric strength decreases the possibility of arcing across the insulator. Thermal breakdown can occur if the leakage current causes a progressive rise in the temperature of the insulator leading also to arcing across the insulator.

Jacket 118 may be an outer metallic layer or electrically conductive layer. Jacket 118 may be in contact with hot formation fluids. Jacket 118 may be made of material having a high resistance to corrosion at elevated temperatures. Alloys that may be used in a desired operating temperature range of jacket 118 include, but are not limited to, 304 stainless steel, 310 stainless steel, Incoloy® 800, and Inconel® 600 (Inco Alloys International, Huntington, W. Va., U.S.A.). The thickness of jacket 118 may have to be sufficient to last for three to ten years in a hot and corrosive environment. A thickness of jacket 118 may generally vary between about 1 mm and about 2.5 mm. For example, a 1.3 mm thick, 310 stainless steel outer layer may be used as jacket 118 to provide good chemical resistance to sulfidation corrosion in a heated zone of a formation for a period of over 3 years. Larger or smaller jacket thicknesses may be used to meet specific application requirements.

One or more insulated conductors may be placed within an opening in a formation to form a heat source or heat sources. Electrical current may be passed through each insulated conductor in the opening to heat the formation. Alternatively, electrical current may be passed through selected insulated conductors in an opening. The unused conductors may be used as backup heaters. Insulated conductors may be electrically coupled to a power source in any convenient manner. Each end of an insulated conductor may be coupled to lead-in cables that pass through a wellhead. Such a configuration typically has a 180° bend (a "hairpin" bend) or turn located near a bottom of the heat source. An insulated conductor that includes a 180° bend or turn may not require a bottom termination, but the 180° bend or turn may be an electrical and/or structural weakness in the heater. Insulated conductors may be electrically coupled together in series, in parallel, or in series and parallel combinations. In some embodiments of heat sources, electrical current may pass into the conductor of an insulated conductor and may be returned through the jacket of the insulated conductor by connecting core 114 to jacket 118 (shown in FIG. 2) at the bottom of the heat source.

Figure 3:
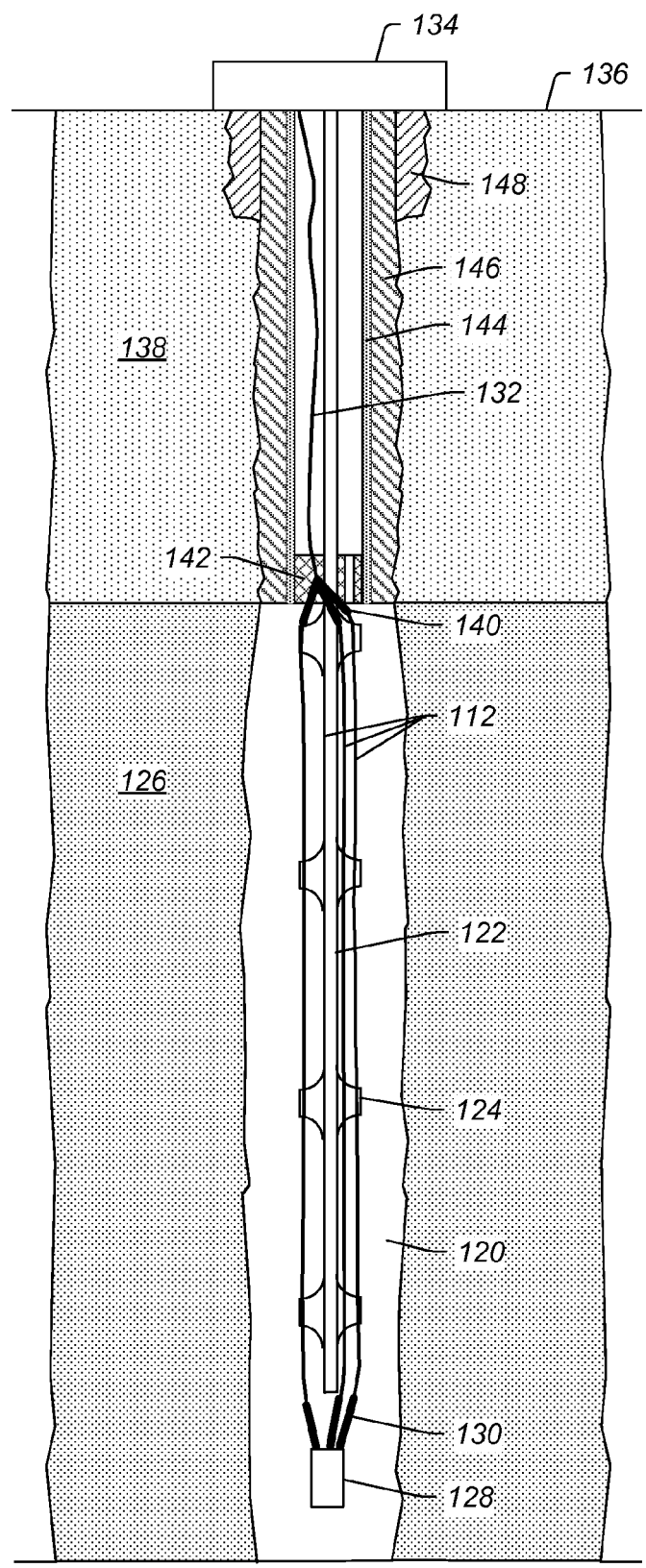
FIG. 3 depicts another embodiment of an insulated conductor heat source.
Figure 4:
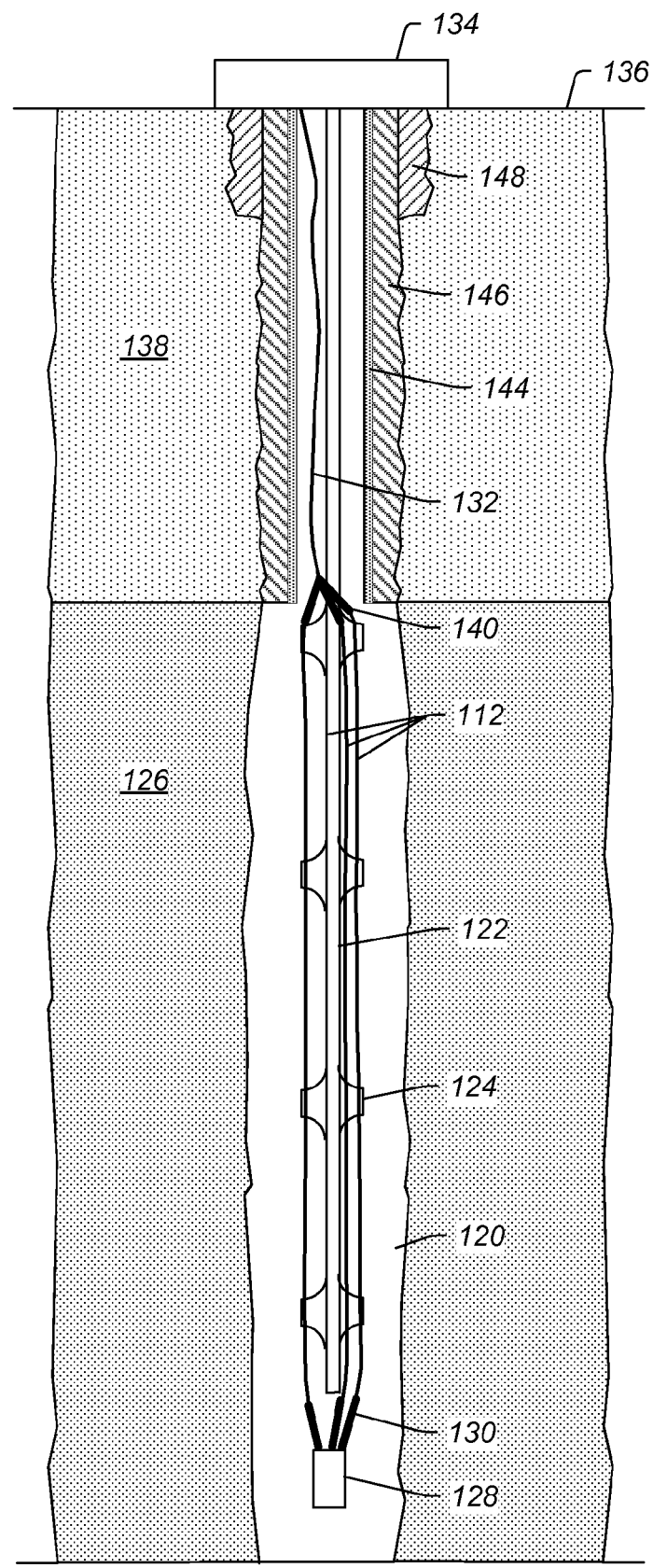
FIG. 4 depicts another embodiment of an insulated conductor heat source.

In some embodiments, three insulated conductors 112 are electrically coupled in a 3-phase wye configuration to a power supply. FIG. 3 depicts an embodiment of three insulated conductors in an opening in a subsurface formation coupled in a wye configuration. FIG. 4 depicts an embodiment of three insulated conductors 112 that are removable from opening 120 in the formation. No bottom connection may be required for three insulated conductors in a wye configuration. Alternately, all three insulated conductors of the wye configuration may be connected together near the bottom of the opening. The connection may be made directly at ends of heating sections of the insulated conductors or at ends of cold pins (less resistive sections) coupled to the heating sections at the bottom of the insulated conductors. The bottom connections may be made with insulator filled and sealed canisters or with epoxy filled canisters. The insulator may be the same composition as the insulator used as the electrical insulation.

Three insulated conductors 112 depicted in FIGS. 3 and 4 may be coupled to support member 122 using centralizers 124. Alternatively, insulated conductors 112 may be strapped directly to support member 122 using metal straps. Centralizers 124 may maintain a location and/or inhibit movement of insulated conductors 112 on support member 122. Centralizers 124 may be made of metal, ceramic, or combinations thereof. The metal may be stainless steel or any other type of metal able to withstand a corrosive and high temperature environment. In some embodiments, centralizers 124 are bowed metal strips welded to the support member at distances less than about 6 m. A ceramic used in centralizer 124 may be, but is not limited to, $Al_2O_3$, MgO, or another electrical insulator. Centralizers 124 may maintain a location of insulated conductors 112 on support member 122 such that movement of insulated conductors is inhibited at operating temperatures of the insulated conductors. Insulated conductors 112 may also be somewhat flexible to withstand expansion of support member 122 during heating.

Support member 122, insulated conductor 112, and centralizers 124 may be placed in opening 120 in hydrocarbon layer 126. Insulated conductors 112 may be coupled to bottom conductor junction 128 using cold pin 130. Bottom conductor junction 128 may electrically couple each insulated conductor 112 to each other. Bottom conductor junction 128 may include materials that are electrically conducting and do not melt at temperatures found in opening 120. Cold pin 130 may be an insulated conductor having lower electrical resistance than insulated conductor 112.

Lead-in conductor 132 may be coupled to wellhead 134 to provide electrical power to insulated conductor 112. Lead-in conductor 132 may be made of a relatively low electrical resistance conductor such that relatively little heat is generated from electrical current passing through the lead-in conductor. In some embodiments, the lead-in conductor is a rubber or polymer insulated stranded copper wire. In some embodiments, the lead-in conductor is a mineral insulated conductor with a copper core. Lead-in conductor 132 may couple to wellhead 134 at surface 136 through a sealing flange located between overburden 138 and surface 136. The sealing flange may inhibit fluid from escaping from opening 120 to surface 136.

In certain embodiments, lead-in conductor 132 is coupled to insulated conductor 112 using transition conductor 140. Transition conductor 140 may be a less resistive portion of insulated conductor 112. Transition conductor 140 may be referred to as "cold pin" of insulated conductor 112. Transition conductor 140 may be designed to dissipate about one-tenth to about one-fifth of the power per unit length as is dissipated in a unit length of the primary heating section of insulated conductor 112. Transition conductor 140 may typically be between about 1.5 m and about 15 m, although shorter or longer lengths may be used to accommodate specific application needs. In an embodiment, the conductor of transition conductor 140 is copper. The electrical insulator of transition conductor 140 may be the same type of electrical insulator used in the primary heating section. A jacket of transition conductor 140 may be made of corrosion resistant material.

In certain embodiments, transition conductor 140 is coupled to lead-in conductor 132 by a splice or other coupling joint. Splices may also be used to couple transition conductor 140 to insulated conductor 112. Splices may have to withstand a temperature equal to half of a target zone operating temperature or higher (for example, up to about five-sixths of the target zone operating temperature) depending on the design of the splice. Density of electrical insulation in the splice should in many instances be high enough to withstand the required temperature and the operating voltage.

In some embodiments, as shown in FIG. 3, packing material 142 is placed between overburden casing 144 and opening 120. In some embodiments, reinforcing material 146 may secure overburden casing 144 to overburden 138. Packing material 142 may inhibit fluid from flowing from opening 120 to surface 136. Reinforcing material 146 may include, for example, Class G or Class H Portland cement mixed with silica flour for improved high temperature performance, slag or silica flour, and/or a mixture thereof. In some embodiments, reinforcing material 146 extends radially a width of from about 5 cm to about 25 cm.

As shown in FIGS. 3 and 4, support member 122 and lead-in conductor 132 may be coupled to wellhead 134 at surface 136 of the formation. Surface conductor 148 may enclose reinforcing material 146 and couple to wellhead 134. Embodiments of surface conductors may extend to depths of approximately 3 m to approximately 515 m into an opening in the formation. Alternatively, the surface conductor may extend to a depth of approximately 9 m into the formation. Electrical current may be supplied from a power source to insulated conductor 112 to generate heat due to the electrical resistance of the insulated conductor. Heat generated from three insulated conductors 112 may transfer within opening 120 to heat at least a portion of hydrocarbon layer 126.

Heat generated by insulated conductors 112 may heat at least a portion of a hydrocarbon containing formation. In some embodiments, heat is transferred to the formation substantially by radiation of the generated heat to the formation. Some heat may be transferred by conduction or convection of heat due to gases present in the opening. The opening may be an uncased opening, as shown in FIGS. 3 and 4. An uncased opening eliminates cost associated with thermally cementing the heater to the formation, costs associated with a casing, and/or costs of packing a heater within an opening. In addition, heat transfer by radiation is typically more efficient than by conduction, so the heaters may be operated at lower temperatures in an open wellbore. Conductive heat transfer during initial operation of a heat source may be enhanced by the addition of a gas in the opening. The gas may be maintained at a pressure up to about 27 bars absolute. The gas may include, but is not limited to, carbon dioxide and/or helium. An insulated conductor heater in an open wellbore may advantageously be free to expand or contract to accommodate thermal expansion and contraction. An insulated conductor heater may advantageously be removable or redeployable from an open wellbore.

In certain embodiments, an insulated conductor heater assembly is installed or removed using a spooling assembly. More than one spooling assembly may be used to install both the insulated conductor and a support member simultaneously. Alternatively, the support member may be installed using a coiled tubing unit. The heaters may be un-spooled and connected to the support as the support is inserted into the well. The electric heater and the support member may be un-spooled from the spooling assemblies. Spacers may be coupled to the support member and the heater along a length of the support member. Additional spooling assemblies may be used for additional electric heater elements.

Temperature limited heaters may be in configurations and/or may include materials that provide automatic temperature limiting properties for the heater at certain temperatures. Examples of temperature limited heaters may be found in U.S. Pat. No. 6,688,387 to Wellington et al.; U.S. Pat. No. 6,991,036 to Sumnu-Dindoruk et al.; U.S. Pat. No. 6,698,515 to Karanikas et al.; U.S. Pat. No. 6,880,633 to Wellington et al.; U.S. Pat. No. 6,782,947 to de Rouffignac et al.; U.S. Pat. No. 6,991,045 to Vinegar et al.; U.S. Pat. No. 7,073,578 to Vinegar et al.; U.S. Pat. No. 7,121,342 to Vinegar et al.; U.S. Pat. No. 7,320,364 to Fairbanks; U.S. Pat. No. 7,527,094 to McKinzie et al.; U.S. Pat. No. 7,584,789 to Mo et al.; U.S. Pat. No. 7,533,719 to Hinson et al.; and U.S. Pat. No. 7,562,707 to Miller; U.S. Patent Application Publication Nos. 2009-0071652 to Vinegar et al.; 2009-0189617 to Burns et al.; 2010-0071903 to Prince-Wright et al.; and 2010-0096137 to Nguyen et al., each of which is incorporated by reference as if fully set forth herein. Temperature limited heaters are dimensioned to operate with AC frequencies (for example, 60 Hz AC) or with modulated DC current.

In certain embodiments, ferromagnetic materials are used in temperature limited heaters. Ferromagnetic material may self-limit temperature at or near the Curie temperature of the material and/or the phase transformation temperature range to provide a reduced amount of heat when a time-varying current is applied to the material. In certain embodiments, the ferromagnetic material self-limits temperature of the temperature limited heater at a selected temperature that is approximately the Curie temperature and/or in the phase transformation temperature range. In certain embodiments, the selected temperature is within about 35° C., within about 25° C., within about 20° C., or within about 10° C. of the Curie temperature and/or the phase transformation temperature range. In certain embodiments, ferromagnetic materials are coupled with other materials (for example, highly conductive materials, high strength materials, corrosion resistant materials, or combinations thereof) to provide various electrical and/or mechanical properties. Some parts of the temperature limited heater may have a lower resistance (caused by different geometries and/or by using different ferromagnetic and/or non-ferromagnetic materials) than other parts of the temperature limited heater. Having parts of the temperature limited heater with various materials and/or dimensions allows for tailoring the desired heat output from each part of the heater.

Temperature limited heaters may be more reliable than other heaters. Temperature limited heaters may be less apt to break down or fail due to hot spots in the formation. In some embodiments, temperature limited heaters allow for substantially uniform heating of the formation. In some embodiments, temperature limited heaters are able to heat the formation more efficiently by operating at a higher average heat output along the entire length of the heater. The temperature limited heater operates at the higher average heat output along the entire length of the heater because power to the heater does not have to be reduced to the entire heater, as is the case with typical constant wattage heaters, if a temperature along any point of the heater exceeds, or is about to exceed, a maximum operating temperature of the heater. Heat output from portions of a temperature limited heater approaching a Curie temperature and/or the phase transformation temperature range of the heater automatically reduces without controlled adjustment of the time-varying current applied to the heater. The heat output automatically reduces due to changes in electrical properties (for example, electrical resistance) of portions of the temperature limited heater. Thus, more power is supplied by the temperature limited heater during a greater portion of a heating process.

In certain embodiments, the system including temperature limited heaters initially provides a first heat output and then provides a reduced (second) heat output, near, at, or above the Curie temperature and/or the phase transformation temperature range of an electrically resistive portion of the heater when the temperature limited heater is energized by a time-varying current. The first heat output is the heat output at temperatures below which the temperature limited heater begins to self-limit. In some embodiments, the first heat output is the heat output at a temperature about 50° C., about 75°

C., about 100° C., or about 125° C. below the Curie temperature and/or the phase transformation temperature range of the ferromagnetic material in the temperature limited heater.

The temperature limited heater may be energized by time-varying current (alternating current or modulated direct current) supplied at the wellhead. The wellhead may include a power source and other components (for example, modulation components, transformers, and/or capacitors) used in supplying power to the temperature limited heater. The temperature limited heater may be one of many heaters used to heat a portion of the formation.

In certain embodiments, the temperature limited heater includes a conductor that operates as a skin effect or proximity effect heater when time-varying current is applied to the conductor. The skin effect limits the depth of current penetration into the interior of the conductor. For ferromagnetic materials, the skin effect is dominated by the magnetic permeability of the conductor. The relative magnetic permeability of ferromagnetic materials is typically between 10 and 1000 (for example, the relative magnetic permeability of ferromagnetic materials is typically at least 10 and may be at least 50, 100, 500, 1000 or greater). As the temperature of the ferromagnetic material is raised above the Curie temperature, or the phase transformation temperature range, and/or as the applied electrical current is increased, the magnetic permeability of the ferromagnetic material decreases substantially and the skin depth expands rapidly (for example, the skin depth expands as the inverse square root of the magnetic permeability). The reduction in magnetic permeability results in a decrease in the AC or modulated DC resistance of the conductor near, at, or above the Curie temperature, the phase transformation temperature range, and/or as the applied electrical current is increased. When the temperature limited heater is powered by a substantially constant current source, portions of the heater that approach, reach, or are above the Curie temperature and/or the phase transformation temperature range may have reduced heat dissipation. Sections of the temperature limited heater that are not at or near the Curie temperature and/or the phase transformation temperature range may be dominated by skin effect heating that allows the heater to have high heat dissipation due to a higher resistive load.

An advantage of using the temperature limited heater to heat hydrocarbons in the formation is that the conductor is chosen to have a Curie temperature and/or a phase transformation temperature range in a desired range of temperature operation. Operation within the desired operating temperature range allows substantial heat injection into the formation while maintaining the temperature of the temperature limited heater, and other equipment, below design limit temperatures. Design limit temperatures are temperatures at which properties such as corrosion, creep, and/or deformation are adversely affected. The temperature limiting properties of the temperature limited heater inhibit overheating or burnout of the heater adjacent to low thermal conductivity "hot spots" in the formation. In some embodiments, the temperature limited heater is able to lower or control heat output and/or withstand heat at temperatures above 25° C., 37° C., 100° C., 250° C., 500° C., 700° C., 800° C., 900° C., or higher up to 1131° C., depending on the materials used in the heater.

The temperature limited heater allows for more heat injection into the formation than constant wattage heaters because the energy input into the temperature limited heater does not have to be limited to accommodate low thermal conductivity regions adjacent to the heater. For example, in Green River oil shale there is a difference of at least a factor of 3 in the thermal conductivity of the lowest richness oil shale layers and the highest richness oil shale layers. When heating such a formation, substantially more heat is transferred to the formation with the temperature limited heater than with the conventional heater that is limited by the temperature at low thermal conductivity layers. The heat output along the entire length of the conventional heater needs to accommodate the low thermal conductivity layers so that the heater does not overheat at the low thermal conductivity layers and burn out. The heat output adjacent to the low thermal conductivity layers that are at high temperature will reduce for the temperature limited heater, but the remaining portions of the temperature limited heater that are not at high temperature will still provide high heat output. Because heaters for heating hydrocarbon formations typically have long lengths (for example, at least 10 m, 100 m, 300 m, 500 m, 1 km or more up to about 10 km), the majority of the length of the temperature limited heater may be operating below the Curie temperature and/or the phase transformation temperature range while only a few portions are at or near the Curie temperature and/or the phase transformation temperature range of the temperature limited heater.

The use of temperature limited heaters allows for efficient transfer of heat to the formation. Efficient transfer of heat allows for reduction in time needed to heat the formation to a desired temperature. For example, in Green River oil shale, pyrolysis typically requires 9.5 years to 10 years of heating when using a 12 m heater well spacing with conventional constant wattage heaters. For the same heater spacing, temperature limited heaters may allow a larger average heat output while maintaining heater equipment temperatures below equipment design limit temperatures. Pyrolysis in the formation may occur at an earlier time with the larger average heat output provided by temperature limited heaters than the lower average heat output provided by constant wattage heaters. For example, in Green River oil shale, pyrolysis may occur in 5 years using temperature limited heaters with a 12 m heater well spacing. Temperature limited heaters counteract hot spots due to inaccurate well spacing or drilling where heater wells come too close together. In certain embodiments, temperature limited heaters allow for increased power output over time for heater wells that have been spaced too far apart, or limit power output for heater wells that are spaced too close together. Temperature limited heaters also supply more power in regions adjacent the overburden and underburden to compensate for temperature losses in these regions.

Temperature limited heaters may be advantageously used in many types of formations. For example, in tar sands formations or relatively permeable formations containing heavy hydrocarbons, temperature limited heaters may be used to provide a controllable low temperature output for reducing the viscosity of fluids, mobilizing fluids, and/or enhancing the radial flow of fluids at or near the wellbore or in the formation. Temperature limited heaters may be used to inhibit excess coke formation due to overheating of the near wellbore region of the formation.

In some embodiments, the use of temperature limited heaters eliminates or reduces the need for expensive temperature control circuitry. For example, the use of temperature limited heaters eliminates or reduces the need to perform temperature logging and/or the need to use fixed thermocouples on the heaters to monitor potential overheating at hot spots.

The temperature limited heaters may be used in conductor-in-conduit heaters. In some embodiments of conductor-in-conduit heaters, the majority of the resistive heat is generated in the conductor, and the heat radiatively, conductively and/or convectively transfers to the conduit. In some embodiments of conductor-in-conduit heaters, the majority of the resistive heat is generated in the conduit.

In some embodiments, a relatively thin conductive layer is used to provide the majority of the electrically resistive heat output of the temperature limited heater at temperatures up to a temperature at or near the Curie temperature and/or the phase transformation temperature range of the ferromagnetic conductor. Such a temperature limited heater may be used as the heating member in an insulated conductor heater. The heating member of the insulated conductor heater may be located inside a sheath with an insulation layer between the sheath and the heating member.

Current techniques allow for the measurement of dielectric properties of insulation along a length of the insulation (measurement of dielectric properties distributed along the length of the insulation). These techniques provide a profile of the dielectric properties with a spatial resolution (space between measurements) based on the type of insulation and the abilities of the measurement system. These techniques are currently used to assess dielectric properties and detect insulation flaws and/or insulation damage. Examples of current techniques are axial tomography and line resonance analysis. A version of axial tomography (Mashikian Axial Tomography) is provided by Instrument Manufacturing Company (IMCORP) (Storrs, Conn., U.S.A.). Mashikian Axial Tomography is disclosed in U.S. Pat. Application Pub. No. 2008-0048668 to Mashikian. A version of line resonance analysis (LIRA) is provided by Wirescan AS (Halden, Norway). Wirescan AS LIRA is disclosed in International Pat. Pub. No. WO 2007/040406 to Fantoni.

Figure 5:
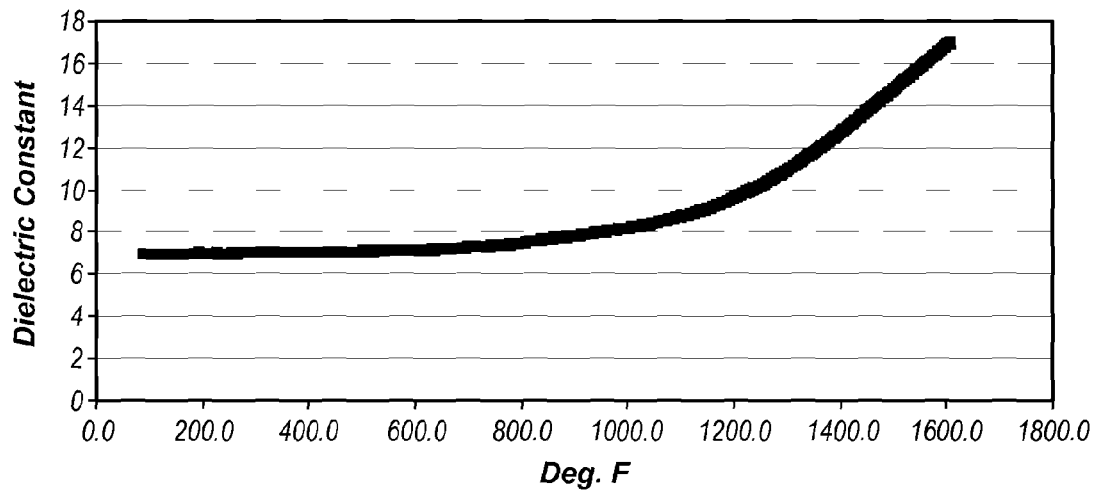
FIG. 5 depicts an example of a plot of dielectric constant versus temperature for magnesium oxide insulation in one embodiment of an insulated conductor heater.
Figure 6:
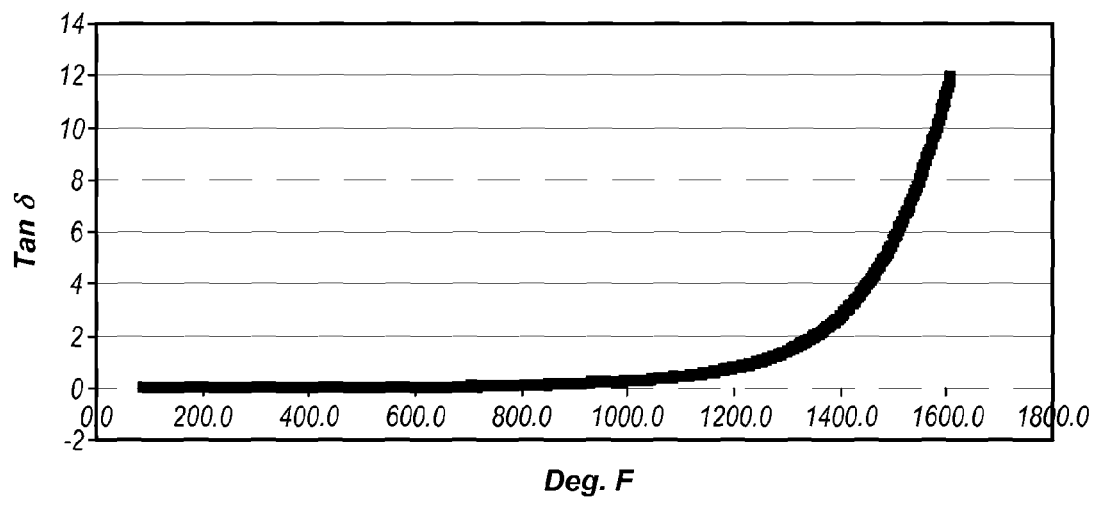
FIG. 6 depicts an example of a plot of loss tangent (tan δ) versus temperature for magnesium oxide insulation in one embodiment of an insulated conductor heater.

The assessment of dielectric properties (using either the current techniques or modified versions of these techniques) may be used in combination with information about the temperature dependence of dielectric properties to assess a temperature profile of one or more energized heaters (heaters that are powered and providing heat). The temperature dependence data of the dielectric properties may be found from simulation and/or experimentation. Examples of dielectric properties of the insulation that may be assessed over time include, but are not limited to, dielectric constant and loss tangent. FIG. 5 depicts an example of a plot of dielectric constant versus temperature for magnesium oxide insulation in one embodiment of an insulated conductor heater. FIG. 6 depicts an example of a plot of loss tangent (tan δ), measured at 60 Hz, versus temperature for magnesium oxide insulation in one embodiment of an insulated conductor heater.

It should be noted that the temperature dependent behavior of a dielectric property may vary based on certain factors. Factors that may affect the temperature dependent behavior of the dielectric property include, but are not limited to, the type of insulation, the dimensions of the insulation, the time the insulation is exposed to environment (for example, heat from the heater), the composition (chemistry) of the insulation, moisture content, and the compaction of the insulation. Thus, it is typically necessary to measure (either by simulation and/or experimentation) the temperature dependent behavior of the dielectric property for the embodiment of insulation that is to be used in a selected heater.

In certain embodiments, one or more dielectric properties of the insulation in a heater having electrical insulation are assessed (measured) and compared to temperature dependence data of the dielectric properties to assess (determine) a temperature profile along a length of the heater (for example, the entire length of the heater or a portion of the heater). For example, the temperature of an insulated conductor heater (such as a mineral insulated (MI) cable heater) may be assessed based on dielectric properties of the insulation used in the heater. Since the temperature dependence of the dielectric property measured is known or estimated from simulation and/or experimentation, the measured dielectric property at a location along the heater may be used to assess the temperature of the heater at that location. Using techniques that measure the dielectric properties at multiple locations along a length of the heater (as is possible with current techniques), a temperature profile along that heater length may be provided.

In some embodiments, as shown by the plots in FIGS. 5 and 6, the dielectric properties are more sensitive to temperature at higher temperatures (for example, above about 900° F. (482° C.), as shown in FIGS. 5 and 6). Thus, in some embodiments, the temperature of a portion of the insulated conductor heater is assessed by measurement of the dielectric properties at temperatures above about 400° C. (about 760° F.). For example, the temperature of the portion may be assessed by measurement of the dielectric properties at temperatures ranging from about 400° C., about 450° C., or about 500° C. to about 800° C., about 850° C., or about 900° C. These ranges of temperatures are above temperatures that can be measured using commercially available fiber optic cable systems. A fiber optic cable system suitable for use in the higher temperature ranges may, however, provide measurements with higher spatial resolution than temperature assessment by measurement of the dielectric properties. Thus, in some embodiments, the fiber optic cable system operable in the higher temperature ranges may be used to calibrate temperature assessment by measurement of dielectric properties.

At temperatures below these temperature ranges (for example, below about 400° C.), temperature assessment by measurement of the dielectric properties may be less accurate. Temperature assessment by measurement of the dielectric properties may, however, provide a reasonable estimate or "average" temperature of portions of the heater. The average temperature assessment may be used to assess whether the heater is operating at temperatures below about 500° C., below about 450° C., or below about 400° C.

Temperature assessment by measurement of dielectric properties may provide a temperature profile along a length or portion of the insulated conductor heater (temperature measurements distributed along the length or portion of the heater). Measuring the temperature profile is more useful for monitoring and controlling the heater as compared to taking temperature measurements at only selected locations (such as temperature measurement with thermocouples). Multiple thermocouples may be used to provide a temperature profile. Multiple wires (one for each thermocouple), however, would be needed. Temperature assessment by measurement of dielectric properties uses only one wire for measurement of the temperature profile, which is simpler and less expensive than using multiple thermocouples. In some embodiments, one or more thermocouples placed at selected locations are used to calibrate temperature assessment by measurement of dielectric properties.

In certain embodiments, the dielectric properties of the insulation in an insulated conductor heater are assessed (measured) over a period of time to assess the temperature and operating characteristics of the heater over the period of time. For example, the dielectric properties may be assessed continuously (or substantially continuously) to provide real-time monitoring of the dielectric properties and the temperature. Monitoring of the dielectric properties and the temperature may be used to assess the condition of the heater during operation of the heater. For example, comparison of the assessed properties at specific locations versus the average properties over the length of the heater may provide information on the location of hot spots or defects in the heater.

In certain embodiments, an assessment (scan) of the insulated conductor heater before the heater is used to provide heat (for example, a baseline assessment (scan)) provides information on locations of defects and/or other discontinuities (for example, splices) that cause abnormalities in the dielectric properties of the heater. The baseline assessment may be used to later detect the presence of hot spots or defects that occur after the heater is energized. For example, assessment of the heater after energizing the heater may show new abnormalities in the dielectric properties of the heater that were not present in the baseline assessment. In some embodiments, the baseline assessment is used to assess the quality of insulation in the heater. For example, the baseline assessment may be used to compare the quality of sections of insulation (for example, blocks of insulation) along the length of the heater.

In some embodiments, the dielectric properties of the insulation change over time. For example, the dielectric properties may change over time because of changes in the oxygen concentration in the insulation over time and/or changes in the water content in the insulation over time. Oxygen in the insulation may be consumed by chromium or other metals used in the insulated conductor heater. Thus, the oxygen concentration decreases with time in the insulation and affects the dielectric properties of the insulation.

Variations in water (moisture) content in the insulation may also affect the dielectric properties of the insulation. Experimentation and/or simulation may be used to provide correlation data between dielectric properties of the insulation and water content in the insulation. Thus, in certain embodiments, assessment of the dielectric properties is used to detect the water content in the heater during heating of the formation. For example, a decrease in the dielectric value of the insulation relative to an initial dielectric value of the insulation having a known water content indicates water has permeated the insulation.

In some embodiments, assessment of water content along the heater is used to inhibit overheating of the heater at locations assessed to have no water content. If the heater is treated as though there is water along the entire length of the heater, portions of the heater (especially for relatively long heaters) that do not have water may overheat because of the lack of water and high energy input into the heater. Thus, assessment of water content using the dielectric properties may provide locations (or at least approximate locations) of little or no water (non-detectable) content along the length of the heater and the power provided to the heater can be adjusted to inhibit overheating such locations on the heater.

In certain embodiments, water content along the heater is related to water content in the formation (for example, if the heater is in an open wellbore, water in the formation may contact the heater in the open wellbore). Thus, assessment of water content along the heater using assessment of the dielectric properties may be used to monitor the presence of water in the formation surrounding the heater. For example, assessment of water content using dielectric properties may provide information on water inflow into the heater wellbore. Inflow of water may cause the temperature of the heater to decrease until water begins to boil off (for example, evaporate), at which time, the heater temperature will begin increasing.

In certain embodiments, assessment of the dielectric properties allows assessment of when water boils off in the wellbore surrounding the heater. Thus, assessment of the dielectric properties may be used in commissioning (startup) of the heater to detect when water surrounding the heater is evaporated. During startup of the heater in a water environment, the heater may be at high power to boil off the water. If the power is not turned down when the surrounding environment changes from predominantly liquid water to predominantly steam, the heater may overheat due to reduced thermal conductivity. Monitoring the dielectric properties to assess when the water is boiled off allows the heater power to be turned down in time to inhibit overheating of the heater. Water boiling off may be detected as a hot spot or defect (for example, a rapid change in temperature) using the assessment of the dielectric properties. Thus, the heater may be turned down when the hot spot or defect is detected using the assessment of the dielectric properties to avoid overheating of the heater during startup of the heater.

In some embodiments, assessment of dielectric properties to assess water content is used in flow assurance operations (for example, flow assurance operations for offshore heating). The assessment of water content using the dielectric properties in the heater allows for detection of leaks or other failures that may allow water into the heater or pipeline with the heater while the heater is still in position offshore. Assessing water inflow while the heater is in position offshore reduces the need to remove the heater for assurance on operation of the heater.

Changes in dielectric properties of the heater over time may be measured and compensated for through experimental and/or simulated data. For example, the insulated conductor heater to be used for temperature assessment may be heated in an oven or other apparatus and the changes in dielectric properties can be measured over time at various temperatures and/or at constant temperatures. In addition, thermocouples may be used to calibrate the assessment of dielectric properties changes over time by comparison of thermocouple data to temperature assessed by the dielectric properties.

In certain embodiments, temperature assessment by measurement of dielectric properties is performed using a computational system such as a workstation or computer. The computational system may receive measurements (assessments) of the dielectric properties along the heater and correlate these measured dielectric properties to assess temperatures at one or more locations on the heater. For example, the computational system may store data about the relationship of the dielectric properties to temperature (such as the data depicted in FIGS. 5 and 6) and/or time, and use this stored data to calculate the temperatures on the heater based on the measured dielectric properties. In some embodiments, the computational system is used to subtract out feedback from power (remove the affect of power on the measurement) provided to the heater when the heater is energized.

In certain embodiments, the computational system is used to monitor the dielectric properties of the heater over a period of time and report and/or control the heater while monitoring the dielectric properties. For example, the computational system may be used to provide an alarm or other report to a user when the dielectric properties (or temperature) vary by more than a selected percentage. In some embodiments, the computational system (automatically) turns down the power to the heater when the dielectric properties (or temperature) vary by more than a desired amount. For example, the power may be ramped down by about 33%, about 50%, or more when the temperature of the heater varies above the desired temperature by more than a desired amount. In some embodiments, the power is turned down while notifying the user with an alarm or other report.

In certain embodiments, temperature assessment by dielectric properties measurement is performed on an energized heater providing heat to the subsurface formation (for example, at least a portion of an insulated conductor heater provided with electric power to resistively heat and providing at least some heat to the subsurface formation from the portion of the insulated conductor). Assessing temperature on the energized heater allows for detection of defects in the insulation on the device actually providing heat to the formation. Assessing temperature on the energized heater, however, may be more difficult due to attenuation of signal along the heater because the heater is resistively heating. This attenuation may inhibit seeing further along the length of the heater (deeper into the formation along the heater). In some embodiments, temperatures in the upper sections of heaters (sections of the heater closer to the overburden, for example, the upper half or upper third of the heater) may be more important for assessment because these sections have higher voltages applied to the heater, are at higher temperatures, and are at higher risk for failure or generation of hot spots. The signal attenuation in the temperature assessment by dielectric properties measurement may not be as significant a factor in these upper sections because of the proximity of these sections to the surface.

In some embodiments, power to the insulated conductor heater is turned off before performing the temperature assessment. Power is then returned to the insulated conductor heater after the temperature assessment. Thus, the insulated conductor heater is subjected to a heating on/off cycle to assess temperature. This on/off cycle may, however, reduce the lifetime of the heater due to the thermal cycling. In addition, the heater may cool off during the non-energized time period and provide less accurate temperature information (less accurate information on the actual working temperature of the heater).

In certain embodiments, temperature assessment by dielectric properties measurement is performed on an insulated conductor that is not to be used for heating or not configured for heating. Such an insulated conductor may be a separate insulated conductor temperature probe. In some embodiments, the insulated conductor temperature probe is a non-energized heater (for example, an insulated conductor heater not powered). The insulated conductor temperature probe may be a stand-alone device that can be located in an opening in the subsurface formation to measure temperature in the opening. In some embodiments, the insulated conductor temperature probe is a looped probe that goes out and back into the opening with signals transmitted in one direction on the probe. In some embodiments, the insulated conductor temperature probe is a single, hanging probe with the signal transmitted along the core and returned along the sheath of the insulated conductor.

In certain embodiments, the insulated conductor temperature probe includes a copper core (to provide better conductance to the end of the cable and better spatial resolution) surrounded by magnesium oxide insulation and an outer metal sheath. The outer metal sheath may be made of any material suitable for use in the subsurface opening. For example, the outer metal sheath may be a stainless steel sheath or an inner sheath of copper wrapped with an outer sheath of stainless steel. Typically, the insulated conductor temperature probe operates up to temperatures and pressures that can be withstood by the outer metal sheath.

In some embodiments, the insulated conductor temperature probe is located adjacent to or near an energized heater in the opening to measure temperatures along the energized heater. There may be a temperature difference between the insulated conductor temperature probe and the energized heater (for example, between about 50° C. and 100° C. temperature differences). This temperature difference may be assessed through experimentation and/or simulation and accounted for in the temperature measurements. The temperature difference may also be calibrated using one or more thermocouples attached to the energized heater.

In some embodiments, one or more thermocouples are attached to the insulated conductor used for temperature assessment (either an energized insulated conductor heater or a non-energized insulated conductor temperature probe). The attached thermocouples may be used for calibration and/or backup measurement of the temperature assessed on the insulated conductor by dielectric property measurement. In some embodiments, calibration and/or backup temperature indication is achieved by assessment of the resistance variation of the core of the insulated conductor at a given applied voltage. Temperature may be assessed by knowing the resistance versus temperature profile of the core material at the given voltage. In some embodiments, the insulated conductor is a loop and current induced in the loop from energized heaters in the subsurface opening provides input for the resistance measurement.

In certain embodiments, insulation material properties in the insulated conductor are varied to provide different sensitivities to temperature for the insulated conductor. Examples of insulation material properties that may be varied include, but are not limited to, the chemical and phase composition, the microstructure, and/or the mixture of insulating materials. Varying the insulation material properties in the insulated conductor allows the insulated conductor to be tuned to a selected temperature range and/or to increase the sensitivity in assessment of temperature using the insulated conductor. The selected temperature range may be selected, for example, for a desired application of the insulated conductor.

In certain embodiments, insulation material properties are adjusted to change the capacitance of the insulation in the heater. FIG. 6 depicts an example of loss tangent versus temperature for magnesium oxide insulation in an insulated conductor heater. Loss tangent (tan δ) is the real capacitance divided by the imaginary capacitance. Thus, the curve in FIG. 6 is a capacitance curve for the insulation in the insulated conductor heater.

The takeoff temperature of the curve (the temperature at which the curve begins to go vertical or increases dramatically—for example, about 1400° F. (about 760° C.) in the example of FIG. 6) is dependent on the capacitance of the insulation. Thus, in certain embodiments, the capacitance of the insulation of the heater is adjusted to change the takeoff temperature of the capacitance curve. For example, the capacitance curve, as depicted in FIG. 6, may be shifted left or right to change the takeoff temperature. If the change in takeoff temperature of a portion insulation of a heater is known, monitoring of the loss tangent allows assessment of when a takeoff temperature of the heater is being reached.

In some embodiments, insulation material properties are varied along the length of the insulated conductor (the insulation material properties are different at selected points within the insulated conductor). Varying properties of the insulation material at known locations along the length of the insulated conductor allows the measurement of the dielectric properties to give location information and/or provide for self-calibration of the insulated conductor in addition to providing temperature assessment.

Figure 8:
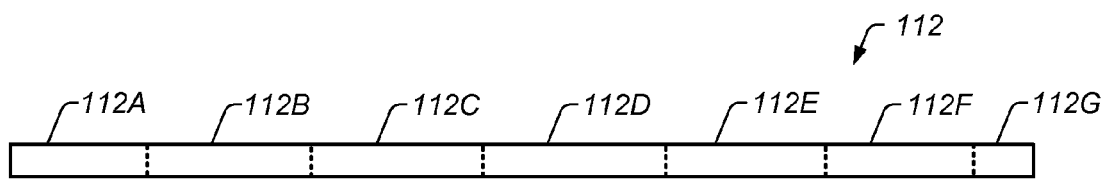
FIG. 8 depicts an embodiment of a length of an insulated conductor.

In certain embodiments, the heater has insulation with different known takeoff temperatures (different capacitances) at different known locations along the length of the heater. FIG. 8 depicts an embodiment of a length of insulated conductor 112. Insulated conductor 112 may include, for example, a plurality of insulated conductor sections 112A-112G. Sections 112A-112G may each have different capacitances (takeoff temperatures) with the locations of the transitions (for example, the locations of the changes in capacitance or takeoff temperature) between the sections being known. In some embodiments, the capacitance of the insulation is varied by providing insulating blocks with different capacitance along the length of the heater. For example, sections 112A-112G may each have blocks with different capacitances. Knowing the locations of the capacitance changes (for example, the junctions or borders between sections 112A-112G) and their associated takeoff temperatures allows monitoring of the loss tangent of individual sections to provide information on when certain portions of the heater reach certain temperatures. In some embodiments, the capacitance of the insulation is tailored to provide temperature assessment of sections of the heater using the different takeoff temperatures. For example, a length of a heater may have several sections (for example, sections 112A-112D) with takeoff temperatures that incrementally step between two temperatures, and the loss tangent may be monitored to assess the temperature of the length based on which section's loss tangent is at its respective takeoff temperature.

In some embodiments, capacitance is measured as a function of length along the heater. The capacitance versus length data may be used to provide temperature information for the heater, when the heater is energized, based on the takeoff of the loss tangent.

In some embodiments, the insulated conductor includes a portion with insulation material properties that allow the portion to act as a reflector. The reflector portion may be used to limit temperature assessment to specific portions of the insulated conductor (for example, a specific length of insulated conductor). One or more reflector portions may be used to provide spatial markers along the length of the insulated conductor. For example, reflector portions may be provided at the transition (junctions) between sections 112A-112G.

Varying the insulation material properties adjusts the activation energy of the insulation material. Typically, increasing the activation energy of the insulation material reduces attenuation in the insulation material and provides better spatial resolution. Lowering the activation energy typically provides better temperature sensitivity. The activation energy may be raised or lowered, for example, by adding different components to the insulation material. For example, adding certain components to magnesium oxide insulation will lower the activation energy. Examples of components that may be added to magnesium oxide to lower the activation energy include, but are not limited to, titanium oxide, nickel oxide, and iron oxide.

In some embodiments, temperature is assessed using two or more insulated conductors. The insulation material in the insulated conductors may have different activation energies to provide a variation in spatial resolution and temperature sensitivity to more accurately assess temperature in the subsurface opening. The higher activation energy insulated conductor may be used to provide better spatial resolution and identify the location of hot spots or other temperature variations more accurately while the lower activation energy insulated conductor may be used to provide more accurate temperature measurement at those locations.

Figure 9:
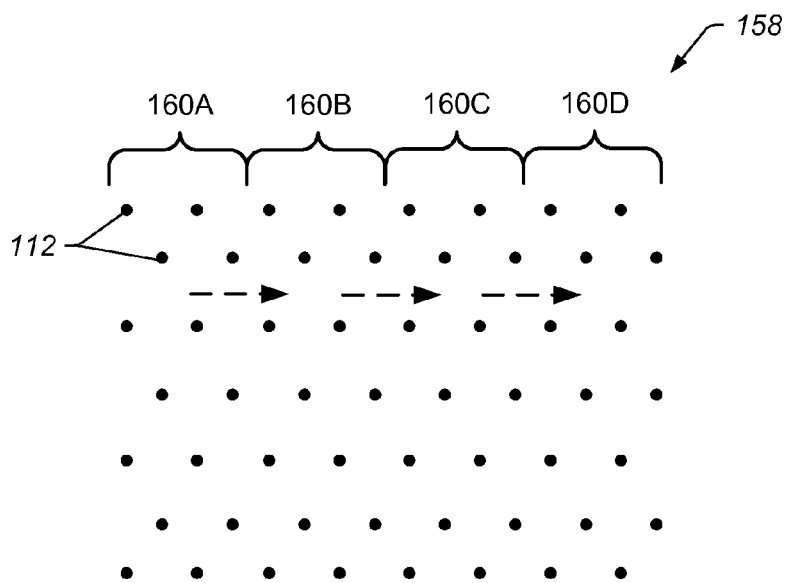
FIG. 9 depicts a top view representation of an embodiment of a pattern of insulated conductor heaters.

In certain embodiments, temperature assessment using dielectric properties is assessed in a pattern of heaters (for example, a pattern of insulated conductor heaters). FIG. 9 depicts a top view representation of an embodiment of pattern 158 of insulated conductor heaters 112. Pattern 158 may be, for example, a triangular pattern of heaters or another regular or irregular pattern of heaters. In certain embodiments, temperature assessment in each of the heaters in pattern 158 provides a thermal image (for example, a three-dimensional (3D) thermal image) of heat in the pattern. Heaters 112 may have substantially similar heat injection rates in pattern 158 or the heaters may have varying heat injection rates. In some embodiments, the thermal image is a differential thermal image (temperature differential image) that shows differences in temperatures between heaters 112 but not absolute temperatures (as the absolute temperatures of the heaters may be difficult to assess). A three-dimensional (3D) image may be generated by assessing the differences in temperature along the lengths of heaters 112 and the differences in temperature between heaters along the assessed lengths. The thermal image may be used to assess the temperature flow around heaters 112 and in pattern 158. For example, the thermal image may provide a temperature gradient in pattern 158. In some embodiments, the thermal image is used to optimize heat flow in pattern 158. For example, heater output may be adjusted based on the thermal image to provide a desired heat flow in pattern 158. Optimization of the heat flow in pattern 158 may provide heat to the pattern more efficiently.

In some embodiments, heaters 112 in pattern 158 each provide different heat injection rates to produce a wave of heat in the pattern. For example, pattern 158 may include sets of heaters 160A-D that each provide different heat injection rates. For example, heaters in set 160B may be added to the pattern after heaters in set 160A and the heaters in set 160B may provide heat at different heat injection rates than the heaters already providing heat in the pattern (the heaters in set 160A). Similarly, heaters in sets 160C and 160D may provide added at later times and provide different heat injection rates. In certain embodiments, heaters in sets 160B-D are added in order after heaters in set 160A (for example, heaters in set 160B are added first followed by heaters in set 160C, followed by heaters in set 160D). In some embodiments, older heaters are ramped down when the later added heaters are added to the pattern.

Temperature assessment in each of the heaters (or at least some heaters in each set 160A-D of heaters) may provide an assessment of the wave of heat (represented by arrows in FIG. 9). In some embodiments, the wave of heat is assessed using differences in temperatures between heaters (for example, differences in temperatures in heaters in each set 160A-D) as absolute temperatures of the heaters may be unknown or difficult to assess. The injection rates of heat from the heaters may be adjusted based on the assessment of the wave of heat to produce desired properties in the wave of heat.

In some embodiments, temperature assessment using the dielectric properties is used in catalytic crackers or hydrofrackers. For example, dielectric properties may be measured up and down a catalytic cracker to assess one or more locations of hot spots along the catalytic cracker.

In some embodiments, temperature is assessed by assessing leakage current from the insulated conductor. Temperature dependence data of the leakage current may be used to assess the temperature based on assessed (measured) leakage current from the insulated conductor. The measured leakage current may be used in combination with information about the temperature dependence of the leakage current to assess a temperature profile of one or more heaters or insulated conductors located in a subsurface opening. The temperature dependence data of the leakage current may be found from simulation and/or experimentation. In certain embodiments, the temperature dependence data of the leakage current is also dependent on the voltage applied to the heater.

Figure 7:
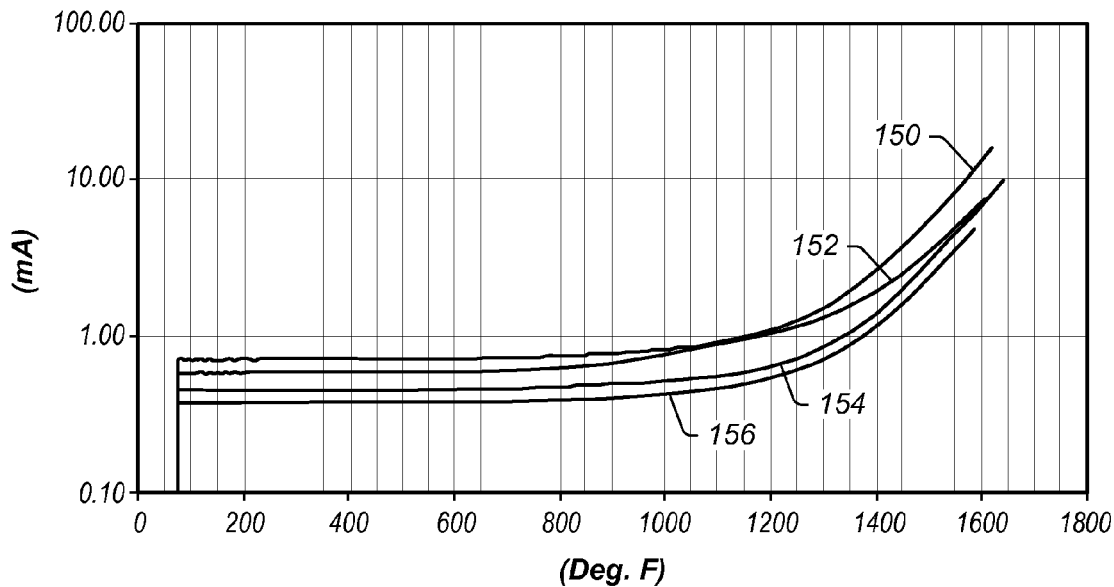
FIG. 7 depicts an example of a plot of leakage current (mA) versus temperature (° F.) for magnesium oxide insulation in one embodiment of an insulated conductor heater at different applied voltages.

FIG. 7 depicts an example of a plot of leakage current (mA) versus temperature (° F.) for magnesium oxide insulation in one embodiment of an insulated conductor heater at different applied 60 Hz voltages. Plot 150 is for an applied voltage of 4300 V. Plot 152 is for an applied voltage of 3600 V. Plot 154 is for an applied voltage of 2800 V. Plot 156 is for an applied voltage of 2100 V.

As shown by the plots in FIG. 7, the leakage current is more sensitive to temperature at higher temperatures (for example, above about 482° C. (about 900° F.). Thus, in some embodiments, the temperature of a portion of the insulated conductor heater is assessed by measurement of the leakage current at temperatures above about 500° C. (about 932° F.) or in a range from about 500° C. to about 870° C., from about 510° C. to about 810° C., or from about 540° C. to about 650° C.

A temperature profile along a length of the heater may be obtained by measuring the leakage current along the length of the heater using techniques known in the art. In some embodiments, assessment of temperature by measuring the leakage current is used in combination with temperature assessment by dielectric properties measurement. For example, temperature assessment by measurement of the leakage current may be used to calibrate and/or backup temperature assessments made by measurement of dielectric properties.

It is to be understood the invention is not limited to particular systems described which may, of course, vary. It is also to be understood that the terminology used herein is for the purpose of describing particular embodiments only, and is not intended to be limiting. As used in this specification, the singular forms "a", "an" and "the" include plural referents unless the content clearly indicates otherwise. Thus, for example, reference to "a layer" includes a combination of two or more layers and reference to "a fluid" includes mixtures of fluids.

In this patent, certain U.S. patents and U.S. patent applications have been incorporated by reference. The text of such U.S. patents and U.S. patent applications is, however, only incorporated by reference to the extent that no conflict exists between such text and the other statements and drawings set forth herein. In the event of such conflict, then any such conflicting text in such incorporated by reference U.S. patents and U.S. patent applications is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system for assessing one or more temperatures along an insulated conductor in an opening in a subsurface formation, comprising:
    an insulated conductor with the insulated conductor being divided into two or more sections along its length, at least two of the sections comprising insulation with different capacitances, wherein the sections with the different capacitances comprise different takeoff temperatures for at least one dielectric property of the insulation.

2. The system of claim 1, wherein the at least one dielectric property is monitored during use to provide a temperature of the length of the insulated conductor when the takeoff temperature of at least one of the sections is reached.

3. The system of claim 2, wherein the at least one dielectric property comprises a loss tangent of the insulation, and wherein the loss tangent of the insulation is configured to increase with temperature at a near vertical rate when the takeoff temperature is reached.

4. The system of claim 1, wherein the at least one dielectric property comprises loss tangent.

5. The system of claim 1, wherein the at least two sections of insulation with different capacitances are provided at known locations along the length of the insulated conductor.

6. The system of claim 1, wherein the insulated conductor comprises a core, an insulation material surrounding the core, and an outer sheath surrounding the insulation material.

7. A method for assessing a temperature in an opening in a subsurface formation, comprising:
    assessing at least one dielectric property along a length of an insulated conductor located in the opening, wherein the length of the insulated conductor is divided into two or more sections along the length, at least two of the sections comprising insulation with different capacitances, wherein the sections with the different capacitances comprise different takeoff temperatures for the at least one dielectric property; and
    assessing a temperature of the length of the insulated conductor to be one of the different takeoff temperatures when the takeoff temperature of at least one of the sections is reached.

8. The method of claim 7, further comprising providing electrical power to at least a portion of the insulated conductor, and providing at least some heat to the subsurface formation from the portion of the insulated conductor.

9. The method of claim 7, wherein the at least one of the dielectric property comprises a loss tangent.

10. The method of claim 7, wherein the assessed temperature is above about 400° C.

11. The method of claim 7, wherein the assessed temperature is in a range between about 400° C. and about 900° C.

12. The method of claim 7, wherein the insulated conductor comprises a core, an insulation material surrounding the core, and an outer sheath surrounding the insulation material.

13. A method for providing heat to a subsurface formation using an insulated conductor heater located in an opening in the formation, comprising:
    assessing a correlation between one or more dielectric properties of insulation in the insulated conductor heater and temperature in the heater;
    providing power to the heater to provide heat to the formation;
    assessing one or more of the dielectric properties along a length of the heater;
    assessing a temperature along the length of the heater; and
    reducing power to the heater when the assessed temperature increases at a rate above a selected rate at one or more locations along the length of the heater.

14. The method of claim 13, wherein the increase at the rate above the selected rate of the assessed temperature is indicative of water evaporating at one or more locations along the length of the heater.

15. The method of claim 13, further comprising turning off power to the heater when the assessed temperature increases at the rate above the selected rate at one or more locations along the length of the heater.

16. The method of claim 13, further comprising evaporating water in the formation using heat provided from the heater.

17. The method of claim 13, further comprising providing electrical power to at least one additional insulated conductor heater located in the opening, and providing at least some heat to the subsurface formation from the additional heater.

18. The method of claim 13, wherein the insulated conductor heater comprises a core, an insulation material surrounding the core, and an outer sheath surrounding the insulation material.

19. The method of claim 13, wherein the insulated conductor heater comprises insulation material that has dielectric properties that are different in two or more sections along the length of the heater.

20. A method for assessing heat flow in a pattern of insulated conductor heaters, comprising:
assessing one or more dielectric properties along lengths of a plurality of insulated conductor heaters in the pattern of heaters, wherein the length of at least one insulated conductor is divided into two or more sections along the length, at least two of the sections comprising insulation with different capacitances;
assessing one or more differences in temperature between the insulated conductor heaters based on the assessed dielectric properties; and
providing an image of heat flow in the pattern of heaters based on the assessed differences in temperatures.

21. The method of claim 20, further comprising providing different heat outputs from one or more of the heaters in the pattern.

22. The method of claim 20, further comprising adjusting heat outputs of one or more of the heaters in the pattern based on the image of heat flow.

23. The method of claim 20, wherein the image of heat flow is a three-dimensional (3D) image.

24. The method of claim 20, wherein the image of heat flow is a temperature differential image.

25. The method of claim 20, further comprising providing additional heaters to the pattern of heaters with the heat outputs of the additional heaters based on the image of heat flow in the pattern.

26. The method of claim 25, further comprising reducing the heat output provided from at least some of the heaters in the pattern.

27. The method of claim 20, further comprising providing at least one additional pattern of heaters adjacent to the pattern of heaters with the heat output of the heaters in the additional pattern based on the image of heat flow.

* * * * *